United States Patent
Muraoka

(10) Patent No.: US 8,970,855 B2
(45) Date of Patent: Mar. 3, 2015

(54) SHEET CONVEYING DEVICE, IMAGE READING APPARATUS AND IMAGE FORMING APPARATUS PROVIDED WITH SAME

(71) Applicant: KYOCERA Document Solutions Inc., Osaka-shi, Osaka (JP)

(72) Inventor: Toshinori Muraoka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/024,708

(22) Filed: Sep. 12, 2013

(65) Prior Publication Data
US 2014/0078528 A1 Mar. 20, 2014

(30) Foreign Application Priority Data
Sep. 19, 2012 (JP) .................................. 2012-205249

(51) Int. Cl.
*B65H 5/06* (2006.01)
*H04N 1/00* (2006.01)
(Continued)

(52) U.S. Cl.
CPC ............ *B65H 5/06* (2013.01); *H04N 1/00615* (2013.01); *G06K 15/16* (2013.01); *B65H 1/08* (2013.01); *B65H 5/26* (2013.01); *B65H 3/0669* (2013.01); *G03G 15/602* (2013.01); *B65H 3/0684* (2013.01); *B65H 3/5223* (2013.01); *B65H 3/56* (2013.01); *B65H 2403/20* (2013.01); *B65H 2403/421* (2013.01); *B65H 2403/512* (2013.01);
(Continued)

(58) Field of Classification Search
USPC ......................................................... 358/1.12
See application file for complete search history.

(56) References Cited

U.S. PATENT DOCUMENTS

2005/0184449 A1   8/2005   Morimoto et al.
2008/0203652 A1   8/2008   Yasukawa et al.
(Continued)

FOREIGN PATENT DOCUMENTS

JP   Hei 6-305594   11/1994
JP   Hei 6-305595   11/1994
(Continued)

OTHER PUBLICATIONS

Office Action Issued for Korean Patent Application No. 10-2013-0111780—Aug. 25, 2014.

*Primary Examiner* — Qian Yang
(74) *Attorney, Agent, or Firm* — Gerald E. Hespos; Michael J. Porco; Matthew T. Hespos

(57) ABSTRACT

A sheet conveying device includes a sheet stacking portion on which sheets are to be stacked, a sheet conveyance path, a sheet feeding member, a driving unit, a stopper and an interlocking unit. The sheet is conveyed from the sheet stacking portion in a predetermined conveying direction in the sheet conveyance path. The sheet feeding member is arranged at an entrance side of the sheet conveyance path and conveys the sheet by being driven and rotated. The stopper is projectable into and retractable from the sheet conveyance path at a side upstream of the sheet feeding member in the conveying direction and prevents the sheets stacked on the sheet stacking portion from coming into contact with the sheet feeding member in a projecting state. The interlocking unit causes the stopper to project into and retract from the sheet conveyance path in accordance with rotational movements of the sheet feeding member.

13 Claims, 14 Drawing Sheets

(51) Int. Cl.
*G06K 15/16* (2006.01)
*B65H 1/08* (2006.01)
*B65H 5/26* (2006.01)
*B65H 3/06* (2006.01)
*G03G 15/00* (2006.01)
*B65H 3/52* (2006.01)
*B65H 3/56* (2006.01)

(52) U.S. Cl.
CPC ......... *B65H 2403/53* (2013.01); *B65H 2801/06* (2013.01); *B65H 2801/39* (2013.01)
USPC .......................................... 358/1.12

(56) References Cited

U.S. PATENT DOCUMENTS

2012/0161383 A1 6/2012 Sato et al.
2012/0193869 A1 8/2012 Hanamoto
2012/0307274 A1* 12/2012 Ito et al. ................ 358/1.12

FOREIGN PATENT DOCUMENTS

JP 2011-213447 10/2011
JP 2012153522 8/2012

* cited by examiner

SHEET CONVEYING DEVICE, IMAGE READING APPARATUS AND IMAGE FORMING APPARATUS PROVIDED WITH SAME

This application is based on Japanese Patent Application Serial No. 2012-205249 filed with the Japan Patent Office on Sep. 19, 2012, the contents of which are hereby incorporated by reference.

BACKGROUND

The present disclosure relates to a sheet conveying device for conveying a sheet, and an image reading apparatus and an image forming apparatus provided with the same.

Conventionally, an automatic document feeder arranged in an automatic document reading unit of an image forming apparatus is known as a sheet conveying device for conveying a sheet. In such an automatic document feeder, a feeding unit is arranged to face a document tray on which a plurality of documents (document stack) are stacked. The sheet feeding unit includes a pickup roller and a feed roller. When the pickup roller feeds documents, the uppermost document is conveyed to a downstream side in a sheet conveying direction by the feed roller.

If the document stack is forcefully inserted to a position toward which the sheet feeding unit of the automatic document feeder is facing, the plurality of documents are squeezed around the feed roller. As a result, it is blocked that the documents are fed one by one by the feed roller. Conventionally, a stopper is known which projects between a pickup roller and a feed roller to prevent the documents from entering around the feed roller when documents are placed. The stopper is rotatably supported on a cover member of the automatic document feeder. Further, the stopper is fixed at a restricting position to restrict the documents by contact with a fixing member arranged on the cover member.

In the above technique, if a user brings a document stack into collision with an upper part of the cover member to align one end edge of the document stack, vibration is applied to the sheet feeding unit to move the sheet feeding unit. In this case, the stopper is separated from the fixing member and moved from the restricting position, with the result that there has been a problem that the entrance of documents cannot be restricted.

The present disclosure was made in view of the above problem and aims to stably realize a position change and posture keeping of a stopper for restricting the entrance of sheets to a sheet feeding position in a sheet conveying device for conveying a sheet and an image reading apparatus and an image forming apparatus provided with the same.

SUMMARY

A sheet conveying device according to one aspect of the present disclosure includes a sheet stacking portion on which sheets are to be stacked, a sheet conveyance path, a sheet feeding member, a driving unit, a stopper and an interlocking unit. The sheet is conveyed from the sheet stacking portion in a predetermined conveying direction in the sheet conveyance path. The sheet feeding member is arranged at an entrance side of the sheet conveyance path and conveys the sheet by being driven and rotated. The driving unit drives and rotates the sheet feeding member. The stopper is projectable into and retractable from the sheet conveyance path at a side upstream of the sheet feeding member in the conveying direction and prevents the sheets stacked on the sheet stacking portion from coming into contact with the sheet feeding member in a projecting state. The interlocking unit causes the stopper to project into and retract from the sheet conveyance path in accordance with rotational movements of the sheet feeding member.

Further, an image reading apparatus according to another aspect of the present disclosure includes the above sheet conveying device and a reading unit. The sheet conveying device conveys a sheet as a document. The reading unit is arranged to face an image reading position arranged in the sheet conveying device and reads a document image of the sheet.

Further, an image forming apparatus according to another aspect of the present disclosure includes the image reading apparatus and an image forming station. The image forming station forms an image on a sheet according to the document image read by the reading unit.

These and other objects, features and advantages of the present disclosure will become more apparent upon reading the following detailed description along with the accompanying drawings.

DETAILED DESCRIPTION

Figure 1:
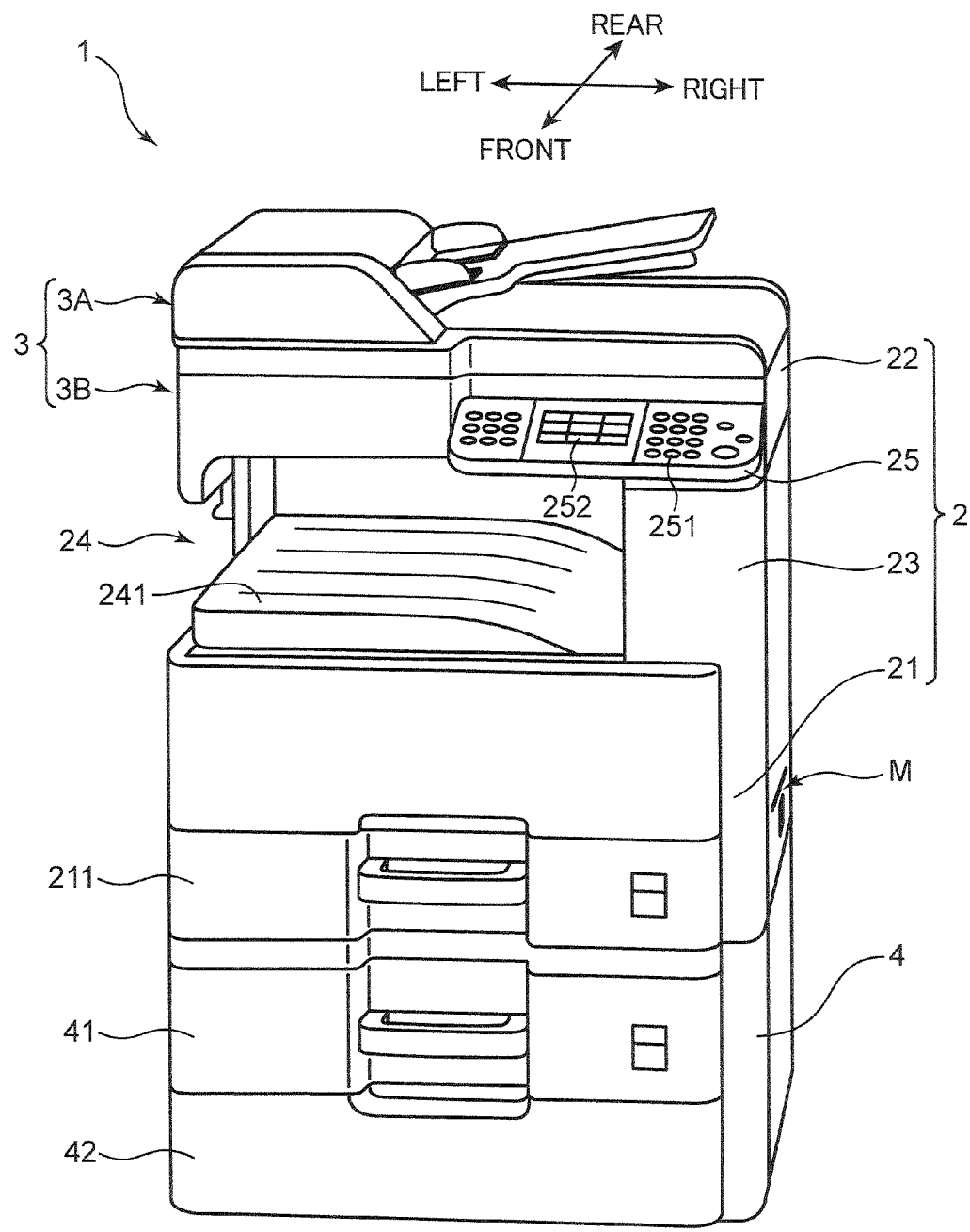
FIG. 1 is a perspective view of an image forming apparatus according to one embodiment of the present disclosure.
Figure 2:
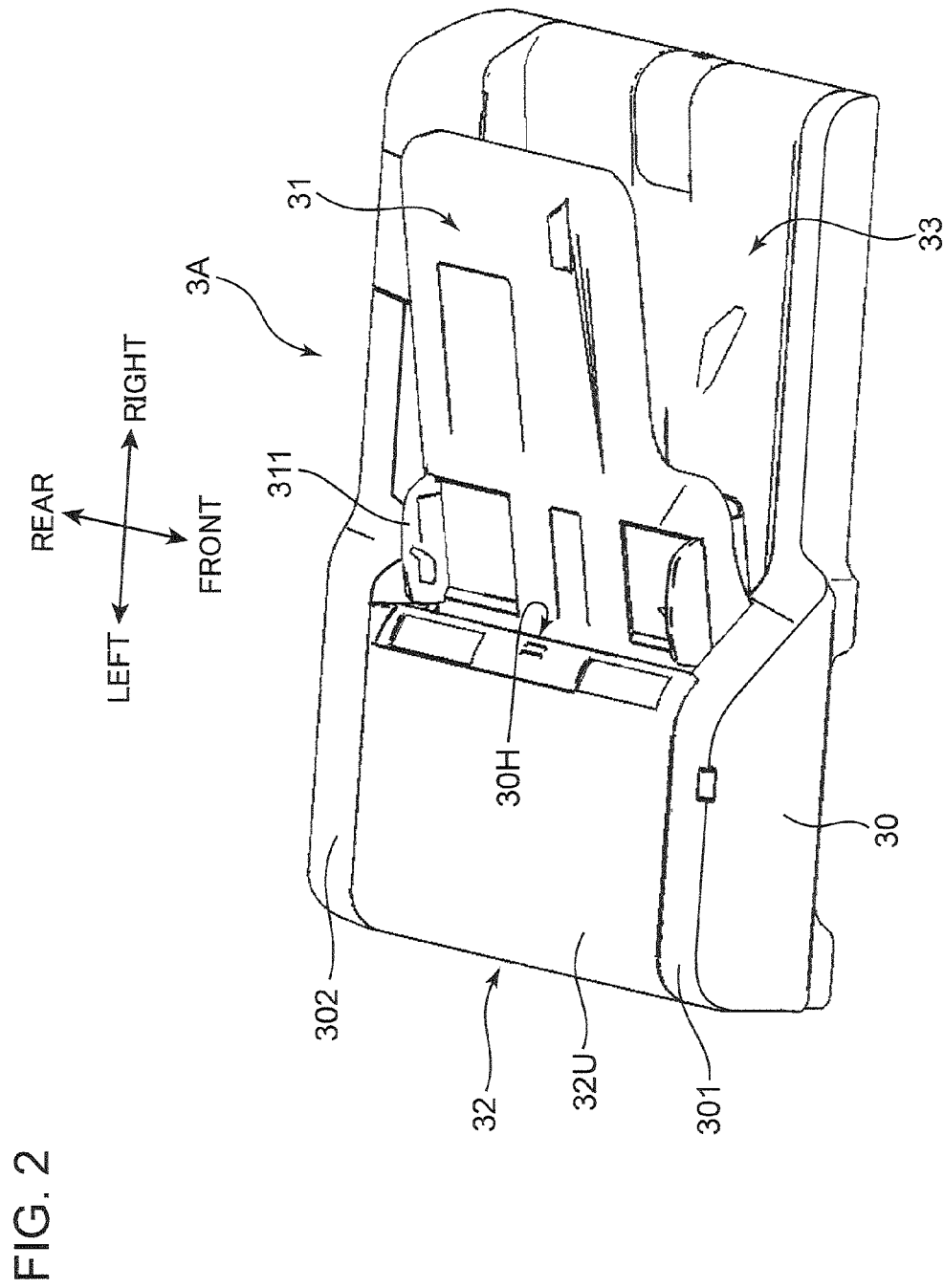
FIG. 2 is a perspective view of an automatic document feeder according to the embodiment of the present disclosure.
Figure 3:
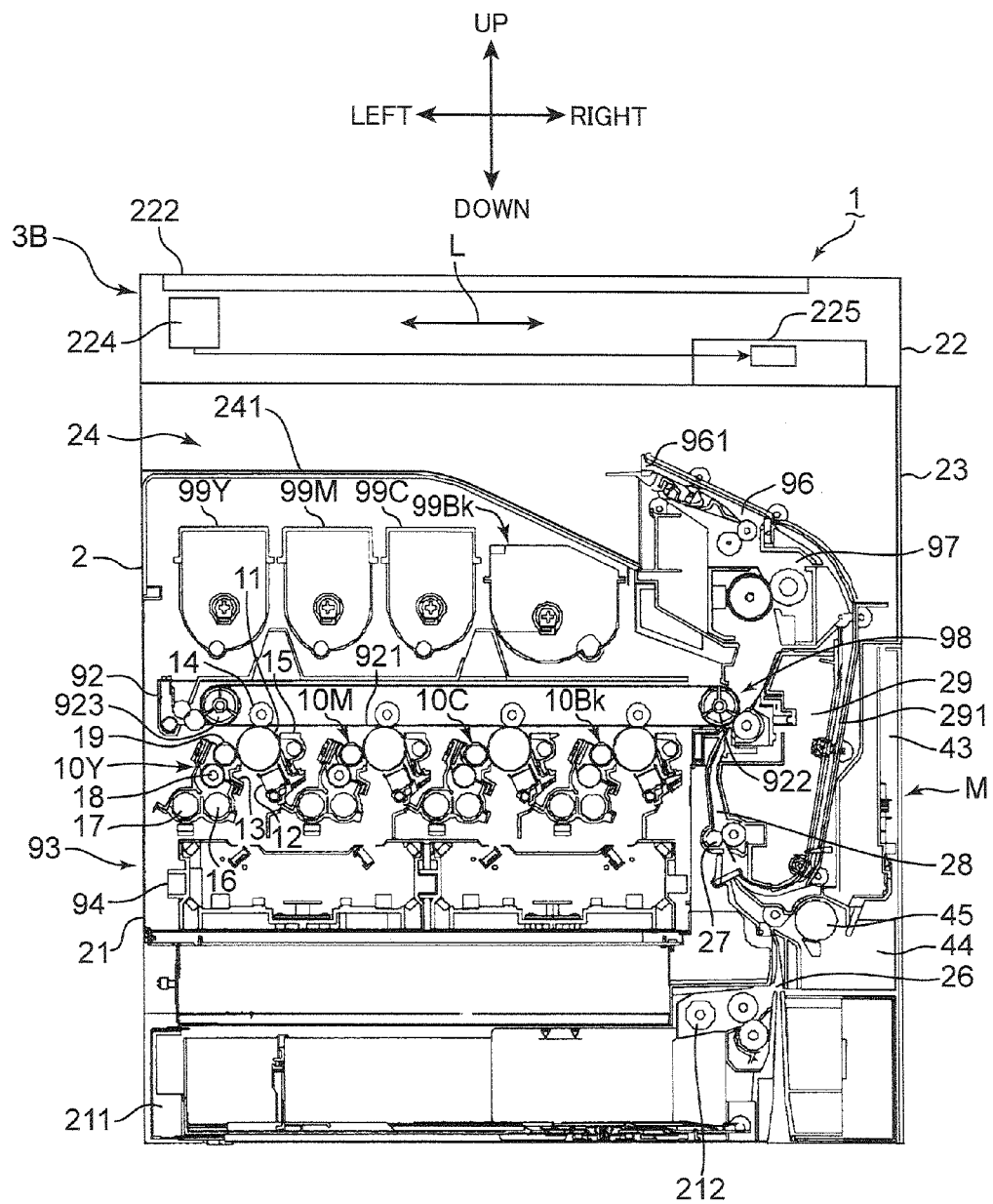
FIG. 3 is a sectional view showing the internal structure of the image forming apparatus according to the embodiment of the present disclosure.
Figure 4:
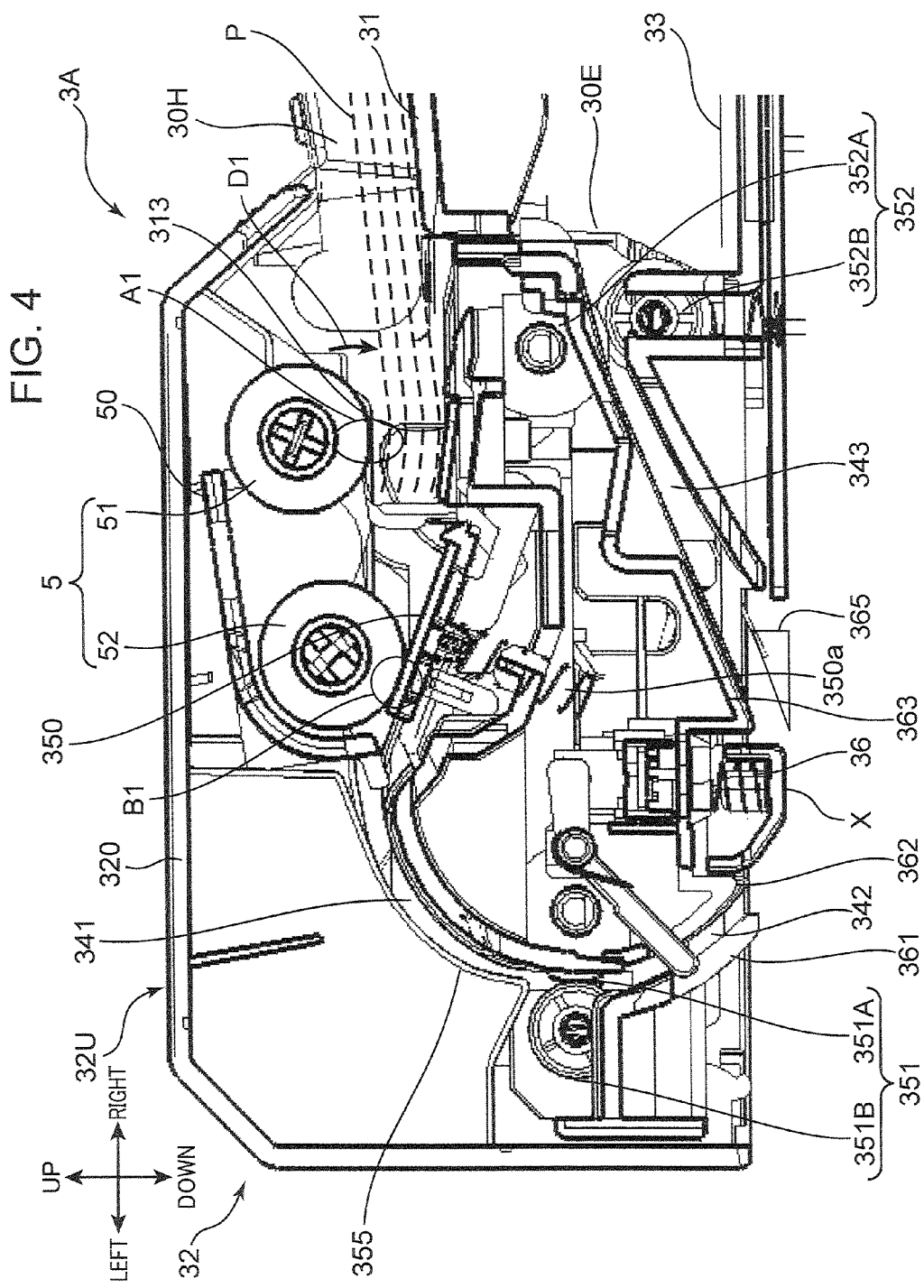
FIG. 4 is a sectional view of a document conveying unit as an essential part of the automatic document feeder according to the embodiment of the present disclosure.

Hereinafter, an embodiment of the present disclosure is described in detail based on the drawings. FIG. 1 is a perspective view showing the external appearance of an image forming apparatus 1 provided with an image reading apparatus 3 according to one embodiment of the present disclosure, FIG. 2 is a perspective view showing the external appearance of an automatic document feeder 3A, and FIG. 3 is a sectional view showing the internal structure of the image forming apparatus 1. Further, FIG. 4 is a sectional view of a document conveying unit 32 as an essential part of the automatic document feeder 3A. Although an internal discharge type copier is illustrated as the image forming apparatus 1 here, the image forming apparatus may be a printer, a facsimile machine or a complex machine provided with these functions.

The image forming apparatus 1 includes an apparatus main body 2 having a substantially rectangular parallelepipedic housing structure and provided with an internal space, the automatic document feeder 3A (sheet conveying device) arranged on the upper surface of the apparatus main body 2, and an extended sheet feeding unit 4 assembled below the apparatus main body 2.

The apparatus main body 2 performs an image forming process on a sheet. The apparatus main body 2 includes a substantially rectangular parallelepipedic lower housing 21, a substantially rectangular parallelepipedic upper housing 22 arranged above the lower housing 21, and a coupling housing 23 coupling the lower housing 21 and the upper housing 22. Various devices for image formation are housed in the lower housing 21, and an image reading unit 3B (reading unit) for optically reading a document image is housed in the upper housing 22. The image reading apparatus 3 is configured by the automatic document feeder 3A and the image reading unit 3B. The internal space enclosed by the lower housing 21, the upper housing 22 and the coupling housing 23 serves as an internal sheet discharge portion 24 capable of storing sheets after image formation. The coupling housing 23 is arranged on the right side surface of the apparatus main body 2 and includes a discharge opening 961 (FIG. 3) for discharging a sheet to the internal sheet discharge portion 24.

The internal space utilized as the internal sheet discharge portion 24 is open to outside on the front and left side surfaces of the apparatus main body 2. A user can take out sheets after image formation from the internal sheet discharge portion 24 by inserting his hand through these open parts. A bottom surface 241 of the internal space is defined by the upper surface of the lower housing 21 and sheets discharged from the discharge opening 961 are stacked thereon.

An operation panel unit 25 is provided to project from the front surface of the upper housing 22. The operation panel unit 25 includes operation keys 251 such as a numerical keypad and a start key, an LCD touch panel 252 and the like, and receives the input of various operation instructions from the user. The user can enter numbers such as the number of sheets to be printed, print density and the like through the operation panel unit 25.

A sheet cassette 211 for storing recording sheets to which an image forming process is to be applied is mounted in the lower housing 21. The extended sheet feeding unit 4 also includes sheet cassettes 41, 42 for storing recording sheets to which the image forming process is to be applied. These sheet cassettes 211, 41 and 42 are cassettes provided for automatic sheet feeding, and a large number of recording sheets can be stored according to size. Further, the sheet cassettes 211, 41 and 42 can be pulled forward from the front surface of the lower housing 21 or the extended sheet feeding unit 4. Note that only the sheet cassette 211 of the lower housing 21 is shown in FIG. 3.

A multi-tray unit M which enables the user to perform manual sheet feeding is attached to the right side surface of the apparatus main body 2. The multi-tray unit M includes a sheet feed tray 43 on which a recording sheet to be manually fed is to be placed and a sheet feeding unit 44 for carrying the recording sheet into an image forming station in the lower housing 21 (FIG. 3). The sheet feed tray 43 is mounted openably and closably relative to the lower housing 21 at a lower end part thereof and set in a closed state when not in use. The user opens the sheet feed tray 43 and places a recording sheet thereon in the case of performing manual sheet feeding.

The automatic document feeder 3A is rotatably mounted on the rear side of the upper surface of the upper housing 22 of the apparatus main body 2. Note that this automatic document feeder 3A is not shown in FIG. 3. In a state held in contact with the upper surface of the upper housing 22 (closed state), the automatic document feeder 3A automatically feeds a document sheet P to be copied toward a predetermined document reading position in the apparatus main body 2. On the other hand, when the user manually places a document sheet at a predetermined document reading position, the automatic document feeder 3A is opened upward (open state).

With reference to FIG. 2, the automatic document feeder 3A includes a main housing 30, a document feed tray 31 (sheet stacking portion), a document conveying unit 32 and a document discharge tray 33. The main housing 30 is a housing for housing various mechanisms provided in the automatic document feeder 3A. The automatic document feeder 3A includes a front wall portion 301 and a rear wall portion 302 raised upward on a left side part where the document conveying unit 32 is housed, and a substantially flat lower part on a right side part.

The document feed tray 31 is a tray on which document sheets to be fed to an image reading position is to be stacked, and attached to the main housing 30 to extend from a feed opening 30H of the main housing 30. The document feed tray 31 includes a pair of cursors 311 for aligning the width of placed document sheets.

The document conveying unit 32 includes a conveyance path and a conveying mechanism for conveying a document sheet on the document feed tray 31 to the document discharge tray 33 by way of the image reading position. The document conveying unit 32 includes an upper cover unit 32U to be fitted into an opening between the front wall portion 301 and the rear wall portion 302 of the main housing 30. These are described in detail later based on FIG. 4.

The document discharge tray 33 is a tray to which a document sheet is to be discharged after a document image is optically read. The upper surface of the lower part on the right side of the main housing 30 serves as the document discharge tray 33.

Next, the internal structure of the apparatus main body 2 is described based on FIG. 3. Toner containers 99Y, 99M, 99C and 99Bk, an intermediate transfer unit 92, an image forming station 93, an exposure unit 94 and the above sheet cassette 211 are successively housed from top in the lower housing 21.

The image forming station 93 includes four image forming units 10Y, 10M, 10C and 10Bk for forming respective toner images of yellow (Y), magenta (M), cyan (C) and black (Bk) to form a full-color toner image. Each of the image forming units 10Y, 10M, 10C and 10Bk includes a photoconductive drum 11 and a charger 12, a developing device 13, a primary transfer roller 14 and a cleaning device 15 arranged around this photoconductive drum 11.

The photoconductive drum 11 rotates about its shaft and an electrostatic latent image and a toner image are formed on the circumferential surface thereof. A photoconductive drum using an amorphous silicon (a-Si) based material can be used as the photoconductive drum 11. The charger 12 uniformly charges the circumferential surface of the photoconductive drum 11. The charged circumferential surface of the photoconductive drum 11 is exposed to light by the exposure unit 94 to form an electrostatic latent image.

The developing device 13 supplies toner to the circumferential surface of the photoconductive drum 11 to develop an electrostatic latent image formed on the photoconductive drum 11. The developing device 13 is for two-component developer and includes agitating rollers 16, 17, a magnetic roller 18 and a developing roller 19. The agitating rollers 16, 17 charge the toner by conveying the two-component developer in a circulating manner while agitating it. A two-component developer layer is carried on the circumferential surface of the magnetic roller 18 and a toner layer formed by the transfer of the toner due to a potential difference between the magnetic roller 18 and the developing roller 19 is formed on the circumferential surface of the developing roller 19. The toner on the developing roller 19 is supplied to the circumferential surface of the photoconductive drum 11 to develop the electrostatic latent image.

The primary transfer roller 14 forms a nip portion in cooperation with the photoconductive drum 11 by sandwiching an intermediate transfer belt 921 provided in the intermediate transfer unit 92, and primarily transfers a toner image onto the photoconductive drum 11 to the intermediate transfer belt 921. The cleaning device 15 cleans the circumferential surface of the photoconductive drum 11 after the transfer of the toner image.

The yellow toner container 99Y, the magenta toner container 99M, the cyan toner container 99C and the black toner container 99Bk are respectively for storing toner of a corresponding color and supply the toners of YMCBk colors to the developing devices 13 of the image forming units 10Y, 10M, 10C and 10Bk corresponding to the respective colors through unillustrated supply paths.

The exposure unit 94 includes various optical devices such as light sources, polygon mirrors, reflecting mirrors and deflecting mirrors and forms an electrostatic latent image by irradiating light based on image data of a document image to the circumferential surface of the photoconductive drum 11 provided in each of the image forming units 10Y, 10M, 10C and 10Bk.

The intermediate transfer unit 92 includes the intermediate transfer belt 921, a drive roller 922 and a driven roller 923. Toner images from a plurality of photoconductive drums 11 are superimposed on the intermediate transfer belt 921 (primary transfer). The superimposed toner images are secondarily transferred to a recording sheet supplied from the sheet cassette 211 in a secondary transfer unit 98. The drive roller 922 and the driven roller 923 for driving and rotating the intermediate transfer belt 921 are rotatably supported on the lower housing 21.

The sheet cassette 211 (41, 42) stores a sheet stack formed by stacking a plurality of recording sheets. A dispensing roller 21 is arranged above the right end side of the sheet cassette 211. By driving the dispensing roller 212, the uppermost sheet of a sheet stack in the sheet cassette 211 is dispensed one by one and carried into a carry-in conveyance path 26. On the other hand, a recording sheet manually placed on the sheet feed tray 43 is carried into the carry-in conveyance path 26 by driving a conveyor roller 45 of the sheet feeding unit 44.

A conveyance path 28 extending up to the discharge opening 961 by way of the secondary transfer unit 98 and a fixing unit 97 and a sheet discharge unit 96 to be described later is provided downstream of the carry-in conveyance path 26. An upstream part of the conveyance path 28 is formed between an inner wall formed on the lower housing 21 and an inner wall forming the inner side surface of a reversing unit 29. Note that the outer side surface of the reversing unit 29 forms one side of a reversing conveyance path 291 for reversing and conveying a sheet in printing both sides of the sheet. A pair of registration rollers 27 are arranged upstream of the secondary transfer unit 98 in the conveyance path 28. A sheet is temporarily stopped at the pair of registration rollers 27 and sent out to the secondary transfer unit 98 at a predetermined timing for image transfer after a skew correction is made.

The fixing unit 97 and the sheet discharge unit 96 are housed in the coupling housing 23. The fixing unit 97 includes a fixing roller and a pressure roller and applies a fixing process by heating and pressing a recording sheet having a toner image secondarily transferred thereto in the secondary transfer unit 98. The recording sheet with the fixed color image is discharged toward the internal sheet discharge portion 24 through the discharge opening 961 by the sheet discharge unit 96 arranged downstream of the fixing unit 97.

The image reading unit 3B (reading unit) is arranged in the upper housing 22. The image reading unit 3B includes a contact glass 222, a CIS unit 224 and an image processing unit 225. The contact glass 222 serves as a reading surface which faces a document sheet being automatically fed from the automatic document feeder 3A and a fixed document placed on the upper surface thereof with a document surface faced down and reads images of these documents.

The CIS unit 224 optically reads document information of a document sheet. The CIS unit 224 extends in forward and backward directions (main scanning direction) and is made movable in a lateral direction (sub scanning direction) by an unillustrated moving unit. The CIS unit 224 includes unillustrated LED light source, GRIN (Graded-Index) lenses and CIS (Contact Image Sensor). Reflected light from a document illuminated by the LED light source is photoelectrically converted by the linearly arranged CIS via the GRIN lenses arranged in an array to read an image of the document. Image data of the document image photoelectrically converted by the CIS is sent to the image processing unit 225. The image processing unit 225 performs various image processings on the image data according to a reading condition of the document image and then sends the processed imaged data to the exposure unit 94.

Next, the internal structure of the automatic document feeder 3A is described in detail based on FIG. 4. FIG. 4 is a sectional view of the document conveying unit 32 as an essential part of the automatic document feeder 3A. The document conveying unit 32 includes first to third conveyance paths 341 to 343 (sheet conveyance path) which serve as a conveyance path for document sheets P, a first conveyor roller pair 351 and a second conveyor roller pair 352 arranged at appropriate positions of these first to third conveyance paths 341 to 343, and a document feeding unit 5 for feeding the document sheets P placed on the document feed tray 31 into the document conveying unit 32.

The first, second and third conveyance paths 341, 342 and 343 are sheet conveyance paths which extend from the aforementioned document feed tray 31 and in which a document sheet P is conveyed in a predetermined conveying direction. More specifically, the first, second and third conveyance paths 341, 342 and 343 form a U-shaped sheet conveyance path extending from the feed opening 30H to a sheet discharge opening 30E, through which the document sheet P is to be discharged to the document discharge tray 33, by way of an optical document reading position X for an image of the document.

The first conveyance path 341 is a conveyance path connected to the document feed tray 31 and extending slightly obliquely downward to the left from the feed opening 30H to the first conveyor roller pair 351 while having a substantially arcuate shape. The first conveyance path 341 is a conveyance path along which the document sheet P sent out from the document feeding unit 5 first passes. An upper conveying surface of this first conveyance path 341 is defined by a first guide member 355 of the upper cover unit 32U.

The second conveyance path 342 is an arcuate conveyance path extending from a downstream end of the first conveyance path 341 to a position facing a contact surface guide 36 forming the document reading position X. Note that the contact surface guide 36 is arranged to face the contact glass 222 (FIG. 3) and forms the document reading position X between itself and the contact glass 222. A lower conveying surface of the second conveyance path 342 is defined by an arcuate second guide member 361 and an upper conveying surface of the second conveyance path 342 is defined by an arcuate third guide member 362 arranged to face the second guide member 361.

The third conveyance path 343 is a conveyance path extending slightly obliquely upward to the right from the position facing the contact surface guide 36 to the sheet discharge opening 30E. An entrance side of the third conveyance path 343 is defined by a document discharge guide 365 arranged on the contact glass 222 and a fourth guide member 363 arranged to face the document discharge guide 365 from above.

The document feeding unit 5 is arranged at an entrance side of the first conveyance path 341. Further, the document feeding unit 5 is assembled on the lower surface of the upper cover unit 32U. The document feeding unit 5 includes a holder 50 for supporting each component, a pickup roller 51 and a feed roller 52 arranged downstream of and at a predetermined distance from the pickup roller 51 in the sheet conveying direction.

The pickup roller 51 is arranged above a leading end part (left end part) of the document feed tray 31 and driven and rotated by a motor 400 to be described later to send document sheets P placed on the document feed tray 31 to a downstream side in the sheet conveying direction. As shown in FIG. 4, a facing pad 313 is arranged at a position facing the pickup roller 51 at the leading end part of the document feed tray 31 of the main housing 30. The pickup roller 51 is rotated in a direction of an arrow D1 to come into contact with the document sheets P. A nip portion A1 where the document sheets P are to be nipped is formed between the pickup roller 51 and the facing pad 313. Note that the pickup roller 51 is moved upward to be separated from the document sheets P again when a feeding operation of the documents P is finished. This movement of the pickup roller 51 is described in detail later.

The feed roller 52 is arranged at the entrance side of the first conveyance path 341 and driven and rotated by the motor 400 to be described later to convey document sheets P sent out from the pickup roller 51 one by one to the downstream side in the sheet conveying direction. As shown in FIG. 4, a separation pad 350 is arranged to face the feed roller 52 from below in the main housing 30. A spring member 350a for pressing the separation pad 350 upward is arranged below the separation pad 350. A nip portion B1 is formed between the feed roller 52 and the separation pad 350 by a pressing force of the spring member 350a.

Each of the first and second conveyor roller pairs 351, 352 is a combination of a drive roller 351A, 352A for generating a rotational drive force for conveying a document sheet and a driven roller 351B, 352B held in contact with the drive roller 351A, 352A to rotate following the rotation of the drive roller.

The first conveyor roller pair 351 is arranged between the first and second conveyance paths 341, 342 and feeds a document sheet sent out from the document feeding unit 5 toward the document reading position X. The second conveyor roller pair 352 is arranged at an end of the third conveyance path 343 to feed the document sheet P finished with a reading operation at the document reading position X to the document discharge tray 33 through the sheet discharge opening 30E.

Figure 5:
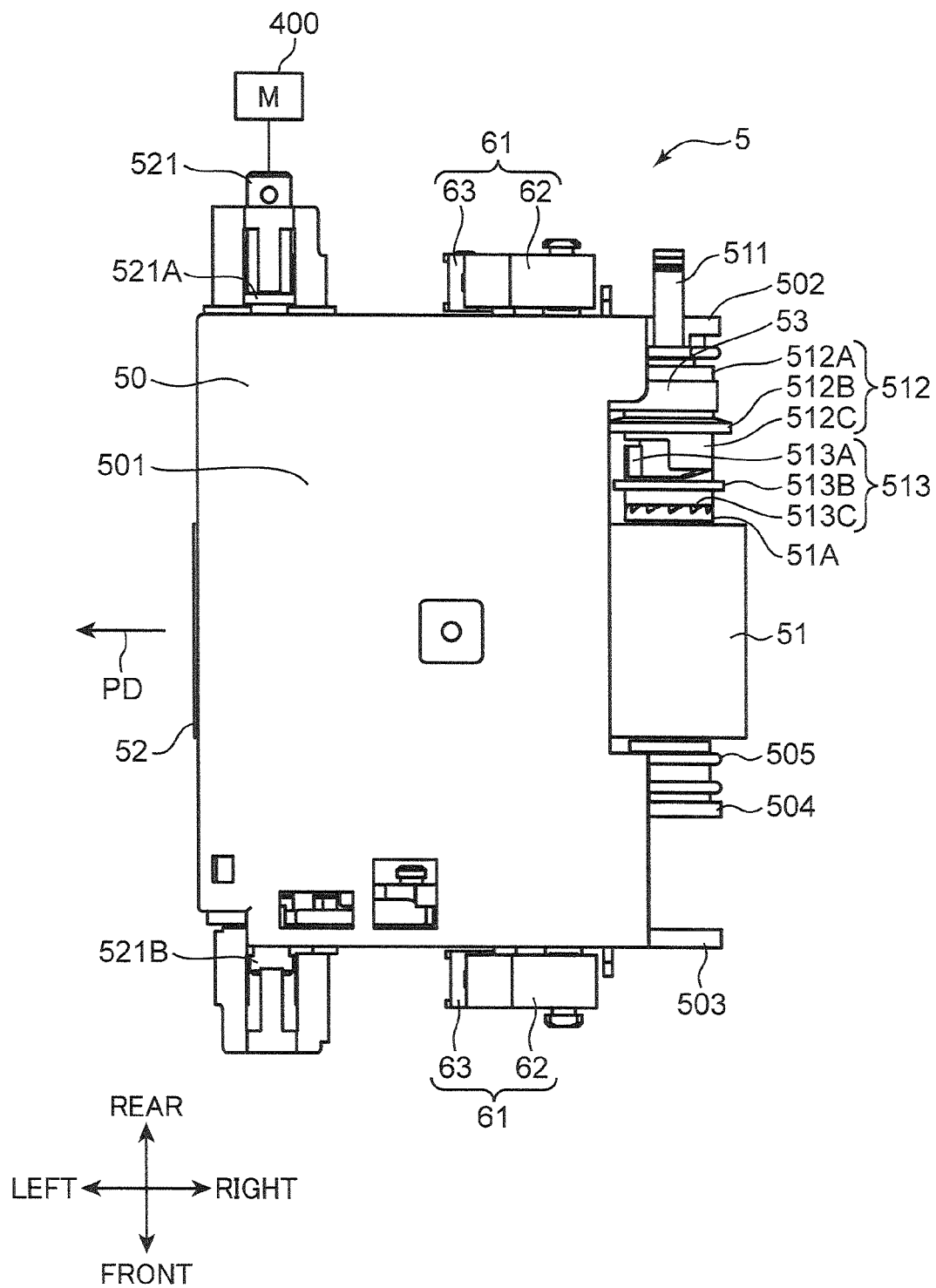
FIG. 5 is a plan view showing a document feeding unit according to the embodiment of the present disclosure.
Figure 6:
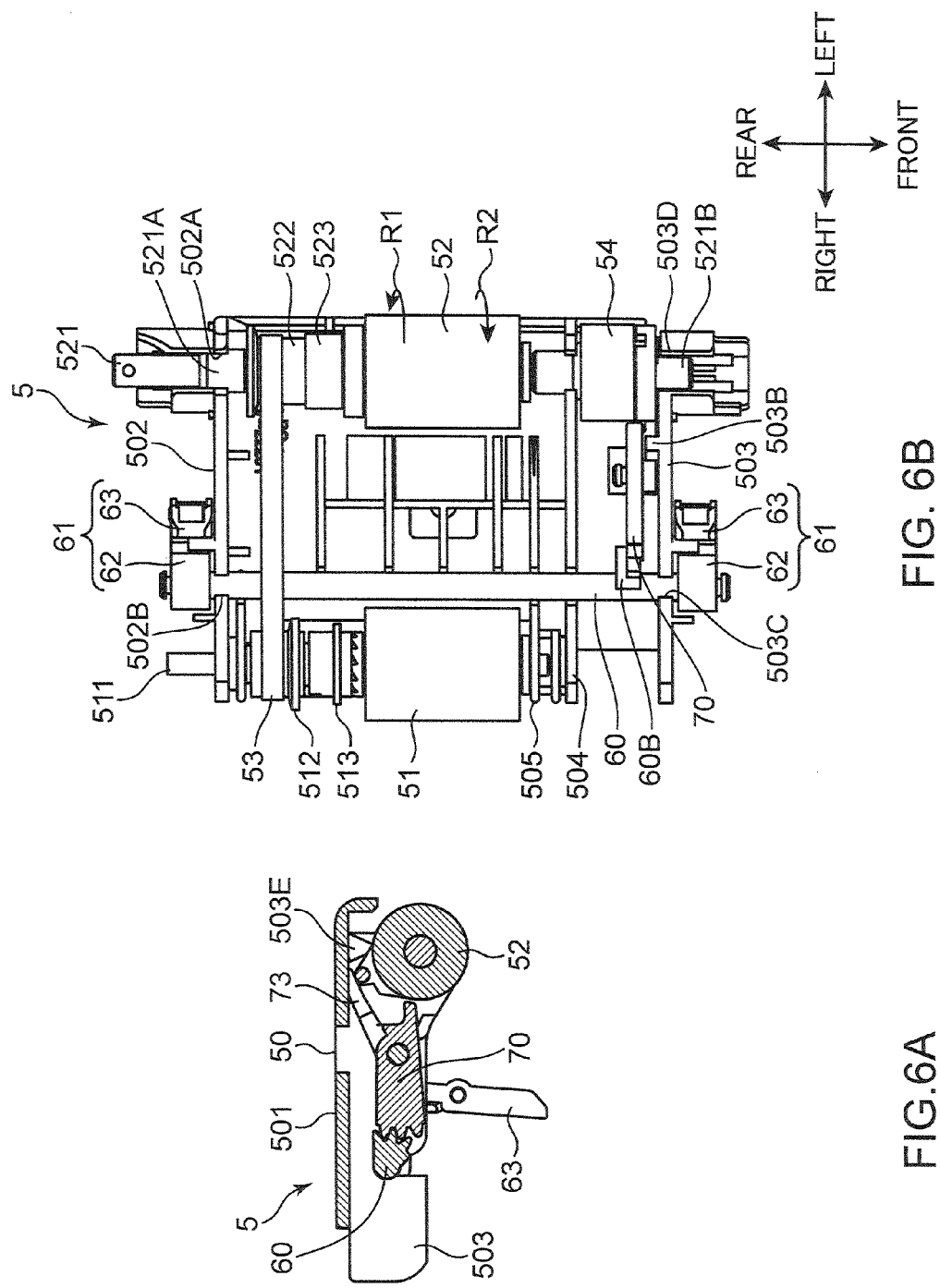
FIGS. 6A and 6B are respectively a sectional view and a bottom view showing the document feeding unit according to the embodiment of the present disclosure.
Figure 7:
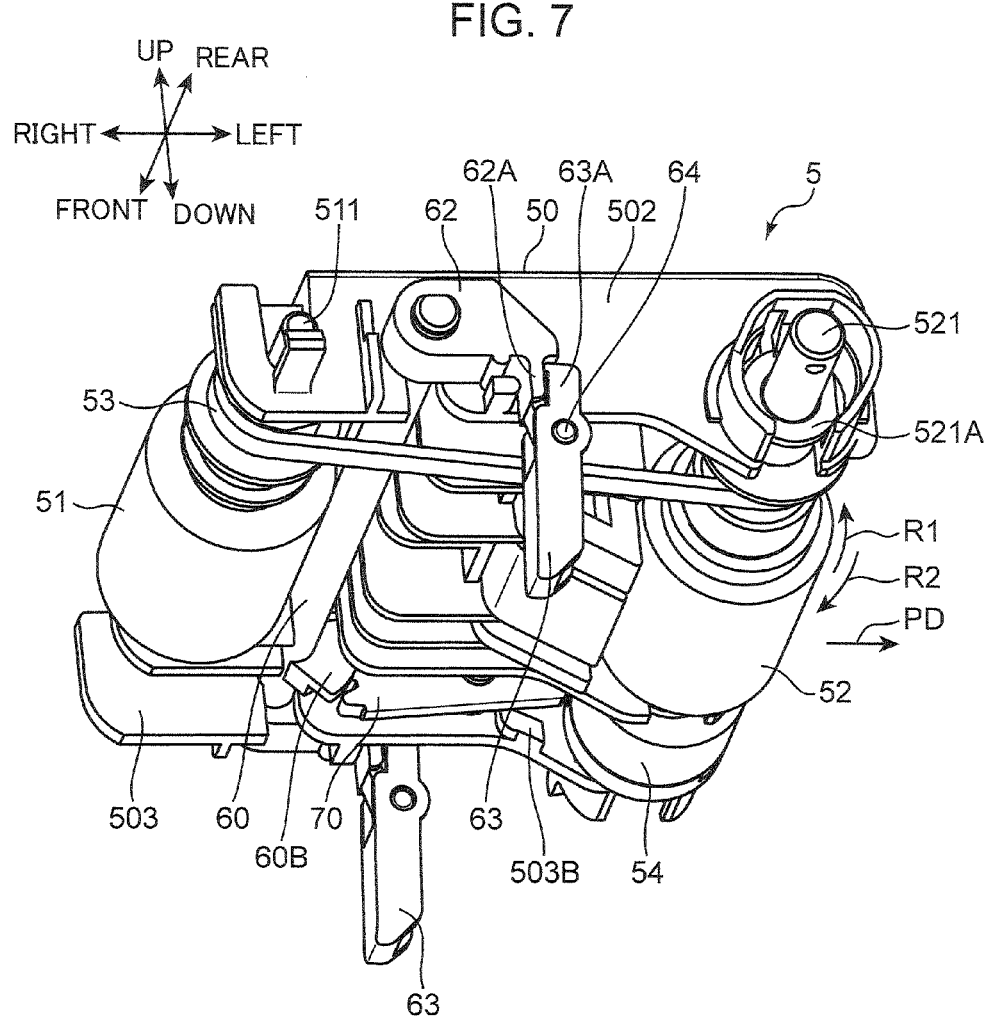
FIG. 7 is a perspective view showing the document feeding unit according to the embodiment of the present disclosure.
Figure 8:
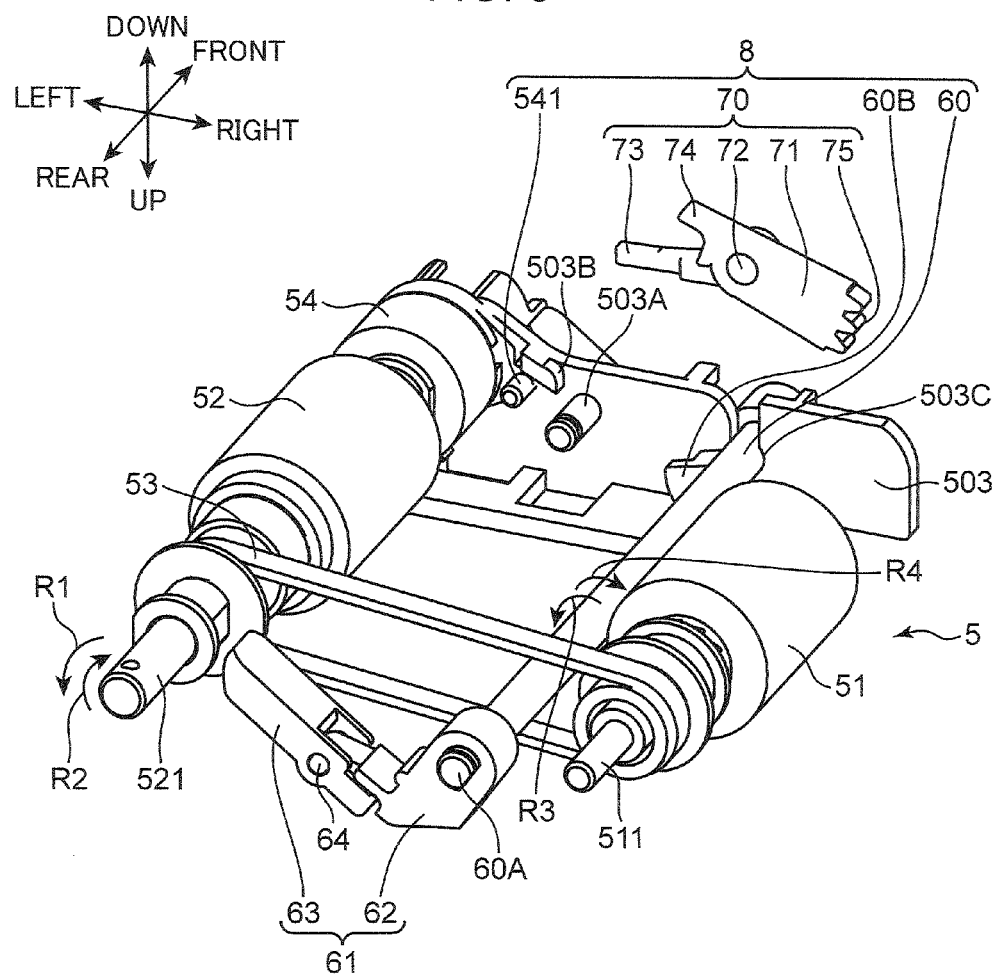
FIG. 8 is an exploded perspective view showing a part of the document feeding unit according to the embodiment of the present disclosure.

Next, the configuration of the document feeding unit 5 according to this embodiment is described with reference to FIGS. 5 to 8. FIG. 5 is a plan view showing the document feeding unit 5 according to this embodiment. FIGS. 6A and 6B are respectively a sectional view and a bottom view showing the document feeding unit 5. FIG. 7 is a perspective view showing the document feeding unit 5. FIG. 8 is an exploded perspective view showing a part of the document feeding unit 5. Note that the internal structure of the document feeding unit 5 is shown vertically inverted in FIG. 8 for the convenience of description.

The document feeding unit 5 includes the holder 50, the pickup roller 51 and the feed roller 52 described above. The document feeding unit 5 also includes a pickup roller shaft 511, an input engaging portion 512 and a transmission engaging portion 513. The document feeding unit 5 further includes a feed roller shaft 521, the motor 400 (driving unit) (FIG. 5), a belt support body 522, a one-way clutch 523, a belt 53 and a torque limiter 54.

The holder 50 is a housing of the document feeding unit 5 and supports the pickup roller 51, the feed roller 52 and the like. The holder 50 includes a ceiling plate 501, a rear wall 502, a front wall 503, a first support plate 504 and a second support plate 505.

As shown in FIG. 5, the ceiling plate 501 is a rectangular plate-like member extending in forward and backward directions and lateral direction. The rear and front walls 502, 503 are wall portions extending downward from the front and rear edges of the ceiling plate 501. With reference to FIG. 6B, the first and second support plates 504, 505 are inner wall portions arranged at positions near the front wall 503 between the rear and front walls 502, 503. The first and second support plates 504, 505 extend downward from the ceiling plate 501 to be parallel to and at a short distance from each other.

The pickup roller shaft 511 serves as an axis of rotation in the rotation of the pickup roller 51. The pickup roller shaft 511 is rotatably supported on the rear wall 502 and the second support plate 505. The aforementioned pickup roller 51 is integrally supported on the pickup roller shaft 511 right behind the second support plate 505.

The input engaging portion 512 is a substantially cylindrical member rotatably supported on the pickup roller shaft 511 at a front side of the rear wall 502. With reference to FIG. 5, the input engaging portion 512 includes a belt support portion 512A, a first flange portion 512B and an input piece 512C. The first flange portion 512B is a disk member arranged in an axial central part of the input engaging portion 512. The input piece 512C and the belt support portion 512A are respectively arranged before and after the first flange portion 512B. The belt support portion 512A has a cylindrical shape and the belt 53 to be described later is mounted thereon. A rotational drive force is transmitted from the belt 53 to the belt support portion 512A. The input piece 512C is a projecting piece for transmitting the rotational drive force to the transmission engaging portion 513. The input piece 512C is formed by causing a circumferential part of the first flange portion 512B to project in an axial direction.

The transmission engaging portion 513 is a substantially cylindrical member arranged between the input engaging portion 512 and the pickup roller 51. The transmission engaging portion 513 has a function of transmitting the rotational drive force of the input engaging portion 512 to the pickup roller 51. The transmission engaging portion 513 includes a transmission piece 513A, a second flange portion 513B and a transmission gear portion 513C. The second flange portion 513B is a disk member arranged in an axial central part of the transmission engaging portion 513. The transmission gear portion 513C and the transmission piece 513A are respectively arranged before and after the second flange portion 513B. The transmission piece 513A is formed by causing a circumferential part of the second flange portion 513B to project in the axial direction. Note that the input piece 512C of the input engaging portion 512 and the transmission piece 513A are arranged at a predetermined distance from each other in a rotational circumferential direction. Thus, there is a small time lag when the rotational drive force is transmitted from the input piece 512C to the transmission piece 513A. The transmission gear portion 513C is composed of a plurality of gear teeth (ratchet gear) arranged in a circumferential direction in a side surface of the second flange portion 513B.

Further, the aforementioned pickup roller 51 includes a roller gear 51A on the rear surface. The roller gear 51A is composed of a plurality of gear teeth (ratchet gear) arranged in the circumferential direction at the same pitches as the transmission gear portion 513C. By the engagement of the transmission gear portion 513C and the roller gear 51A, the rotational drive force is transmitted from the transmission gear portion 513C to the pickup roller 51.

The feed roller shaft 521 (rotary shaft) rotatably supports the aforementioned feed roller 52 and serves as an axis of rotation in the rotation of the feed roller 52. The feed roller shaft 521 is coupled to the motor 400 via an unillustrated joint or gear. Further, the feed roller shaft 521 is rotatably supported on the rear and front walls 502, 503. More specifically, a first bearing 521A is fitted into a first cut portion 502A formed on a left end part of the rear wall 502. Further, a second bearing 521B is fitted into a bearing mounting portion 503D formed on a left end part of the front wall 503. The feed roller shaft 521 is rotatably supported on the first and second bearings 521A, 521B.

The motor 400 is coupled to the feed roller shaft 521 to drive and rotate the feed roller shaft 521. In this embodiment, the motor 400 can be rotated in forward and reverse directions to drive and rotate the feed roller shaft 521 (feed roller 52) in a first direction (arrow R1 of FIGS. 6B and 7) and a second direction (arrow R2 of FIGS. 6B and 7) opposite to the first direction. Note that the feed roller 52 conveys a document sheet P to the downstream side in the sheet conveying direction (arrow PD of FIGS. 5 and 7) by being driven and rotated in the first direction.

The belt support body 522 is a cylindrical member fixed to the feed roller shaft 521 at the front side of the first bearing 521A. The belt 53 is mounted on the outer periphery of the belt support body 522.

The belt 53 is mounted with a predetermined tension between the belt support body 522 and the belt support portion 512A of the input engaging portion 512 as described above. The belt 53 has a function of transmitting a rotational drive force input to the feed roller shaft 521 by the motor 400 to the pickup roller shaft 511.

The one-way clutch 523 is rotatably supported on the feed roller shaft 521 at the front side of the belt support body 522. The one-way clutch 523 transmits the rotation of the feed roller shaft 521 to the feed roller 52 during forward rotation (first direction) of the feed roller 52. Further, the one-way clutch 523 causes the feed roller 52 to rotate idly relative to the feed roller shaft 521 when the feed roller 52 is rotated in a sheet feeding direction by a sheet. As a result, it is inhibited that the feed roller 52 blocks the conveyance of a document sheet P when the document sheet P is conveyed by the drive roller 351A (FIG. 4) downstream of the feed roller 52 in the sheet conveying direction.

The torque limiter 54 is rotatably supported on the feed roller shaft 521 between the feed roller 52 and the front wall 503. The torque limiter 54 has a substantially cylindrical shape. The torque limiter 54 is rotated in the first and second directions integrally with the feed roller shaft 521 with a first rotational torque and idly rotated relative to the feed roller shaft 521 with a second rotational torque higher than the first rotational torque. Such a relatively low first rotational torque is generated when the rotation of the feed roller 52 is started. Further, the second rotational torque is equivalent to a torque during steady rotation of the feed roller 52.

The torque limiter 54 includes a contact portion 541 (FIG. 8) (contact piece). The contact portion 541 is a projecting piece projecting in a radial direction of the feed roller shaft 521 from an outer peripheral part of the torque limiter 54. Further, a tip part of the contact portion 541 projects while having a small height in an axial direction of the feed roller shaft 521. The torque limiter 54 and the contact portion 541 function as an interlocking unit 8 for changing the positions of stoppers 63 to be described later.

Further, the document feeding unit 5 includes stopper assembly 61 and a lever shaft 60 (support shaft). A pair of stopper assemblies 61 is arranged at opposite front and rear end parts of the holder 50. The pair of stopper assemblies 61 is respectively arranged along the rear wall 502 and the front wall 503. The stopper assay 61 includes a stopper support portion 62 and the stopper 63. The stopper support portion 62 rotatably supports the stopper 63. Further, the stopper support portion 62 is supported on the lever shaft 60. The stopper 63 is rotatably supported on a tip part of the stopper support portion 62. Specifically, with reference to FIG. 8, the stopper 63 is rotatable about a pivot portion 64. The pivot portion 64 is formed by inserting a shaft formed on the tip part of the stopper support portion 62 into a hole formed in a side surface of the stopper 63. Note that, as shown in FIG. 7, an upper end part 63A of the stopper 63 can come into contact with a projection 62A projecting from the stopper support portion 62 during the rotation of the stopper 63. Thus, an angle of rotation of the stopper 63 with respect to the stopper support portion 62 is restricted to a range in which the stopper 63 is rotated clockwise in a posture shown in FIG. 7.

The stoppers 63 can project into and retract from the first conveyance path 341 (FIG. 4) between the document feed tray 31 and the feed roller 52. The stoppers 63 prevent document sheets P stacked on the document feed tray 31 from coming into contact with the feed roller 52 in a state projecting into the first conveyance path 341. Specifically, if document sheets P are strongly pushed toward the feed roller 52 when a plurality of document sheets P are placed on the document feed tray 31 by the user, the document sheets P are squeezed into the nip portion B1 (FIG. 4) between the feed roller 52 and the separation pad 350. In this case, the function of the feed roller 52 to feed the document sheets P one by one is hindered. Thus, a trouble as described above is preferably inhibited by the stoppers 63 projecting into the first conveyance path 341.

The lever shaft 60 extends in an extending direction of the feed roller shaft 521 and rotatably supported in the holder 50. More specifically, the lever shaft 60 is rotatably supported in a substantially U-shaped first shaft support portion 502B (FIG. 6) formed on the rear wall 502 and a substantially U-shaped second shaft support portion 503C formed on the front wall 503. The lever shaft 60 supports the stopper assembly 61. Specifically, as shown in FIG. 8, by mounting a D-surface portion 60A formed on one end of the lever shaft 60 into a hole portion (not shown) having a D-shaped cross section and open on the stopper support portion 62, the lever shaft 60 and the stopper assembly 61 are united. Note that the above configuration is similarly arranged on the other end side of the lever shaft 60 of FIG. 8. The lever shaft 60 functions as a part of the interlocking unit 8 described below.

Further, the document feeding unit 5 includes the interlocking unit 8. The interlocking unit 8 causes the stoppers 63 to project into and retract from the first conveyance path 341 in accordance with rotational movements of the feed roller 52. More specifically, the interlocking unit 8 causes the stoppers 63 to project into the first conveyance path 341 in correspondence with the rotation of the feed roller 52 in the second direction while causing the stoppers 63 to retract from the first conveyance path 341 in correspondence with the rotation of the feed roller 52 in the first direction. The interlocking unit 8 includes a lever 70 (coupling member) and a first gear portion 60B (engageable gear) in addition to the torque limiter 54 and the lever shaft 60 described above (FIG. 8).

The lever 70 is rotatably arranged at the inner side of the front wall 503. The lever 70 comes into contact with the contact portion 541 in correspondence with the rotation of the feed roller 521 in the first direction (arrow R1 of FIG. 8) and in the second direction (arrow R2 of FIG. 8) to rotate the lever shaft 60 in a third direction (arrow R3 of FIG. 8) and a fourth direction (arrow R4 of FIG. 8) opposite to the third direction. The lever 70 includes a lever main body 71, a supporting point portion 72, a first projection 73, a second projection 74 and a second gear portion 75 (engaging gear).

The lever main body 71 is a main body part of the lever 70 and a member long and narrow substantially in the lateral direction. The supporting point portion 72 is an opening formed to extend in forward and backward directions in a substantially longitudinal central part of the lever main body 71. A lever shaft 503A projecting backward from the front wall 503 is inserted into the supporting point portion 72. As a result, the lever 70 is rotatable about the supporting point portion 72.

The first projection 73 is a projection projecting from the supporting point portion 72 toward the torque limiter 54. Further, the second projection 74 extends from the supporting point portion 72 toward the torque limiter 54 at a side downstream of the first projection 73 in the first direction and forms a forked shape together with the first projection 73. Specifically, the first and second projections 73, 74 extend from the supporting point portion 72 in different directions. The first and second projections 73, 74 come into contact with the contact portion 541 with the rotation of the torque limiter 54. The second gear portion 75 is arranged to face the lever shaft 60 at a side of the supporting point portion 72 opposite to the first and second projections 73, 74. The second gear portion 75 is composed of a plurality of gear teeth arcuately and adjacently arranged on an end part of the lever main body 71.

The first gear portion 60B is an outer peripheral part of the lever shaft 60 and arranged to face the second gear portion 75 of the lever 70. Similarly to the second gear portion 75, the first gear portion 60B is composed of a plurality of arcuately and adjacently arranged gear teeth. When the lever shaft 503A of the front wall 503 is inserted into the supporting point portion 72 of the lever 70, the first and second gear portions 60B, 75 are engaged. As a result, the lever 60 is made rotatable with the rotation of the lever 70 about the supporting point portion 72.

Figure 9:
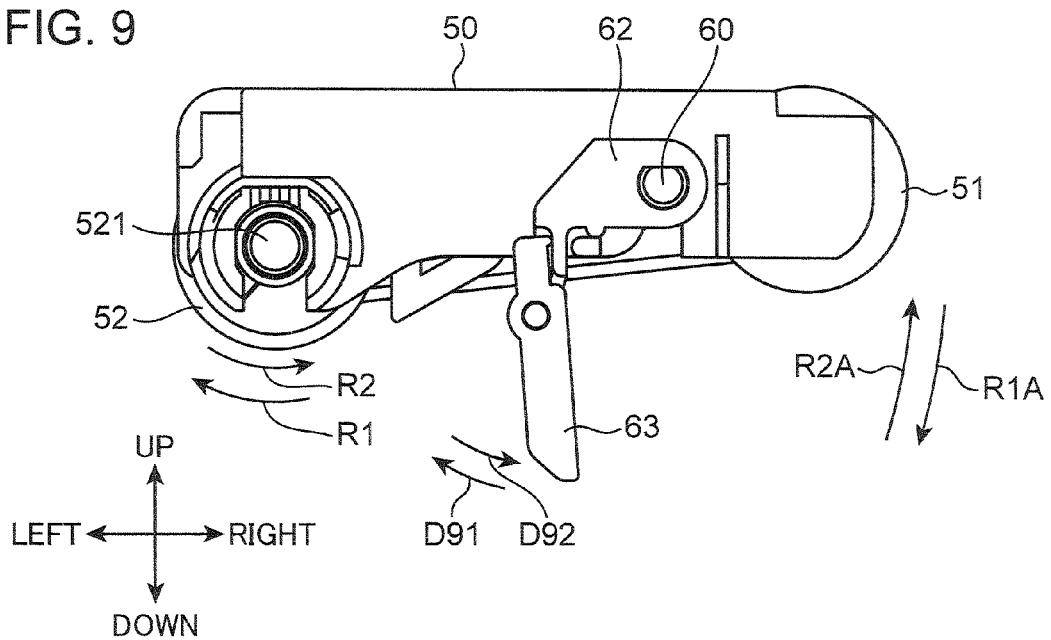
FIG. 9 is a side view showing the operation of the document feeding unit according to the embodiment of the present disclosure.
Figure 10:
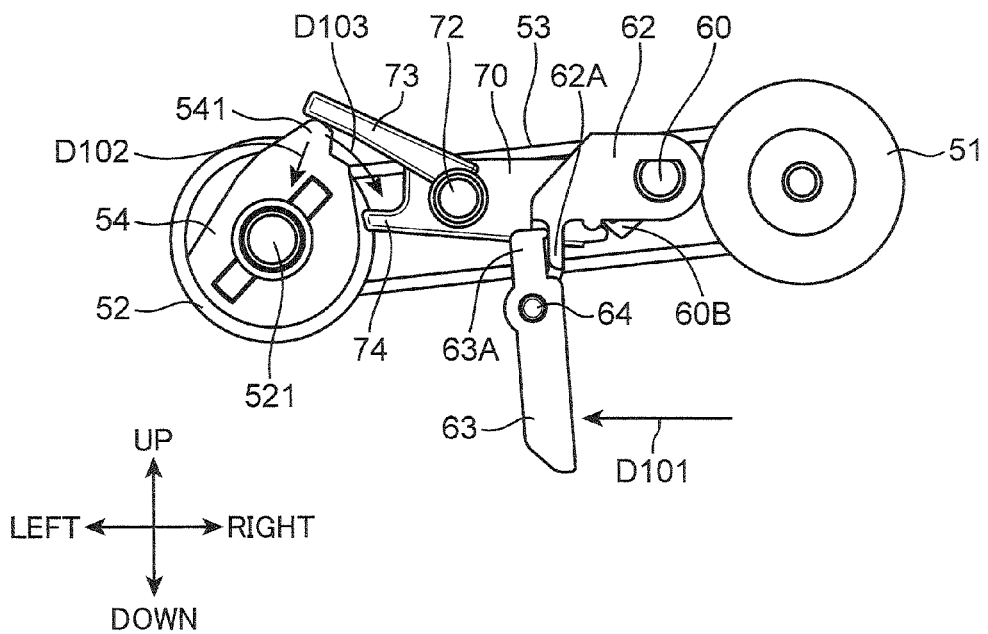
FIG. 10 is a side view showing an internal state of the document feeding unit of FIG. 9.
Figure 11:
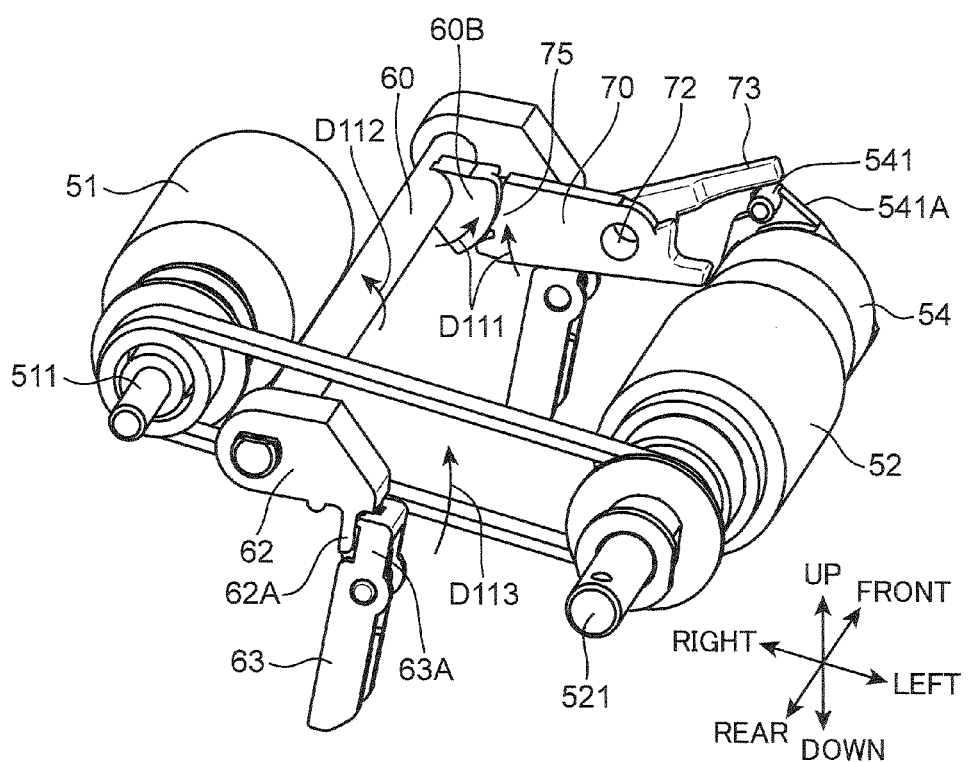
FIG. 11 is a perspective view showing the internal state of the document feeding unit of FIG. 9.
Figure 12:
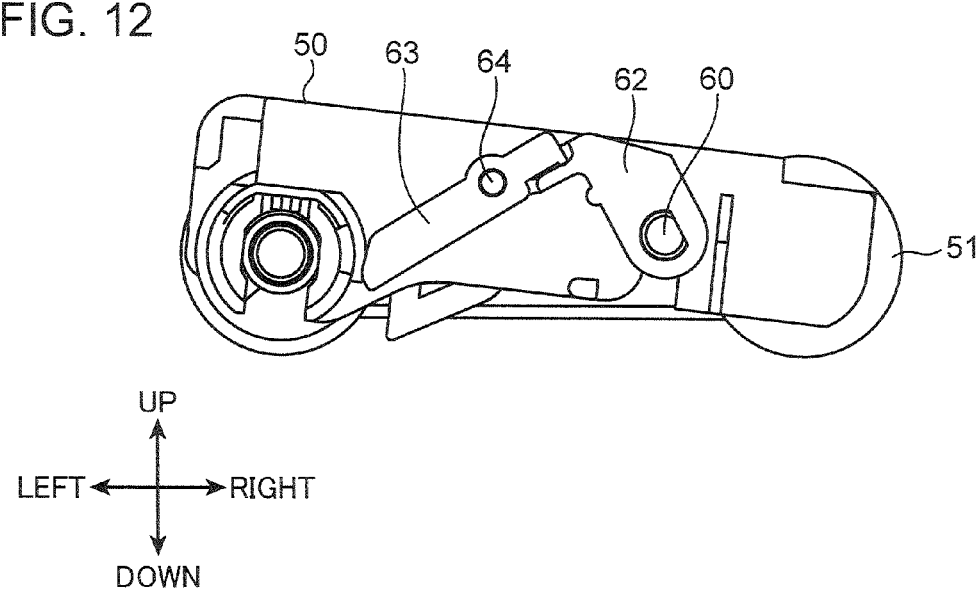
FIG. 12 is a side view showing the operation of the document feeding unit according to the embodiment of the present disclosure.
Figure 13:
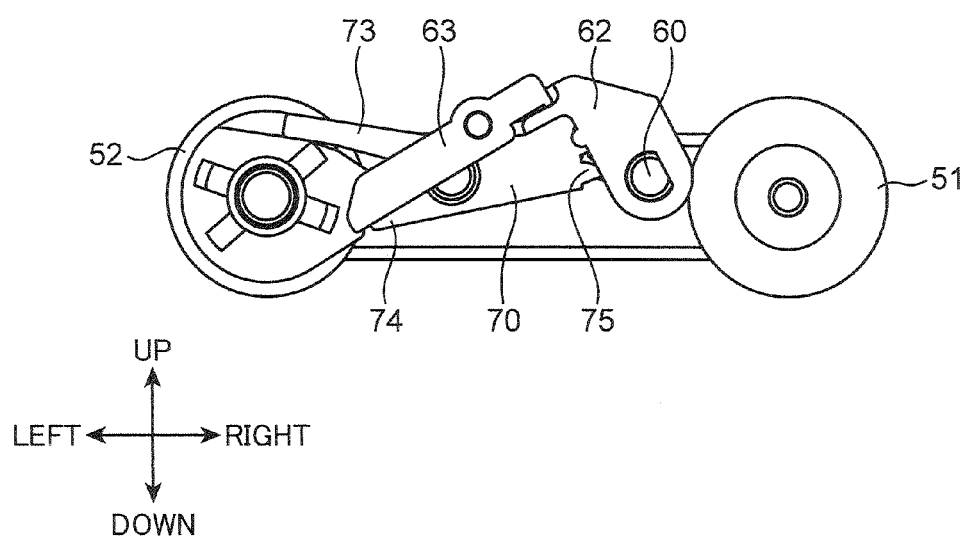
FIG. 13 is a side view showing an internal state of the document feeding unit of FIG. 12.
Figure 14:
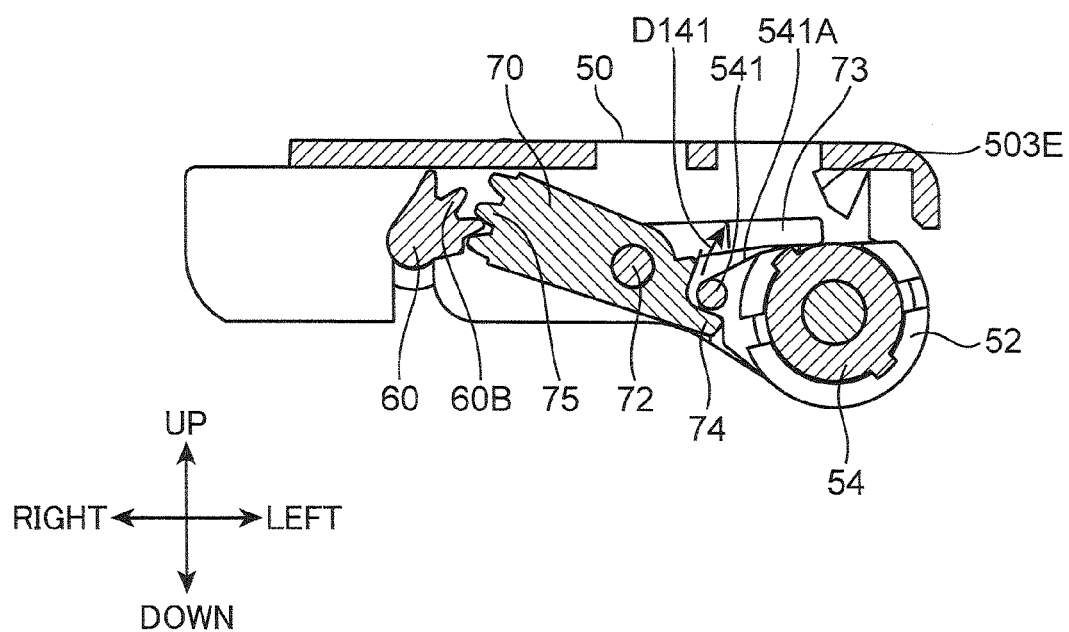
FIG. 14 is a sectional view showing the internal state of the document feeding unit of FIG. 12.
Figure 15:
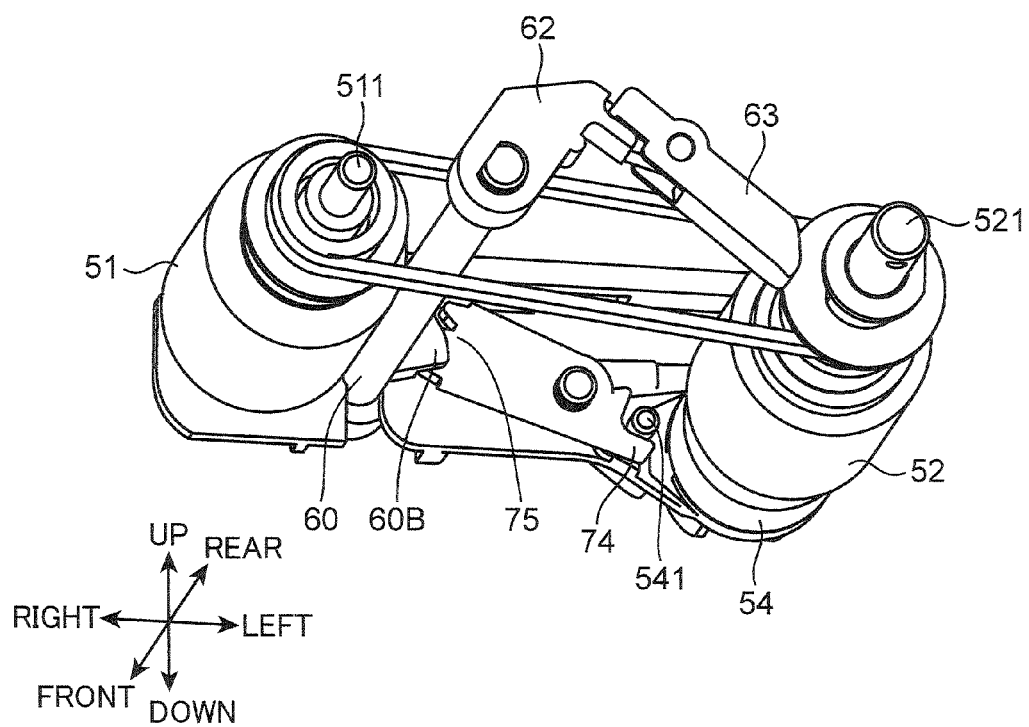
FIG. 15 is a perspective view showing the internal state of the document feeding unit of FIG. 12.
Figure 16:
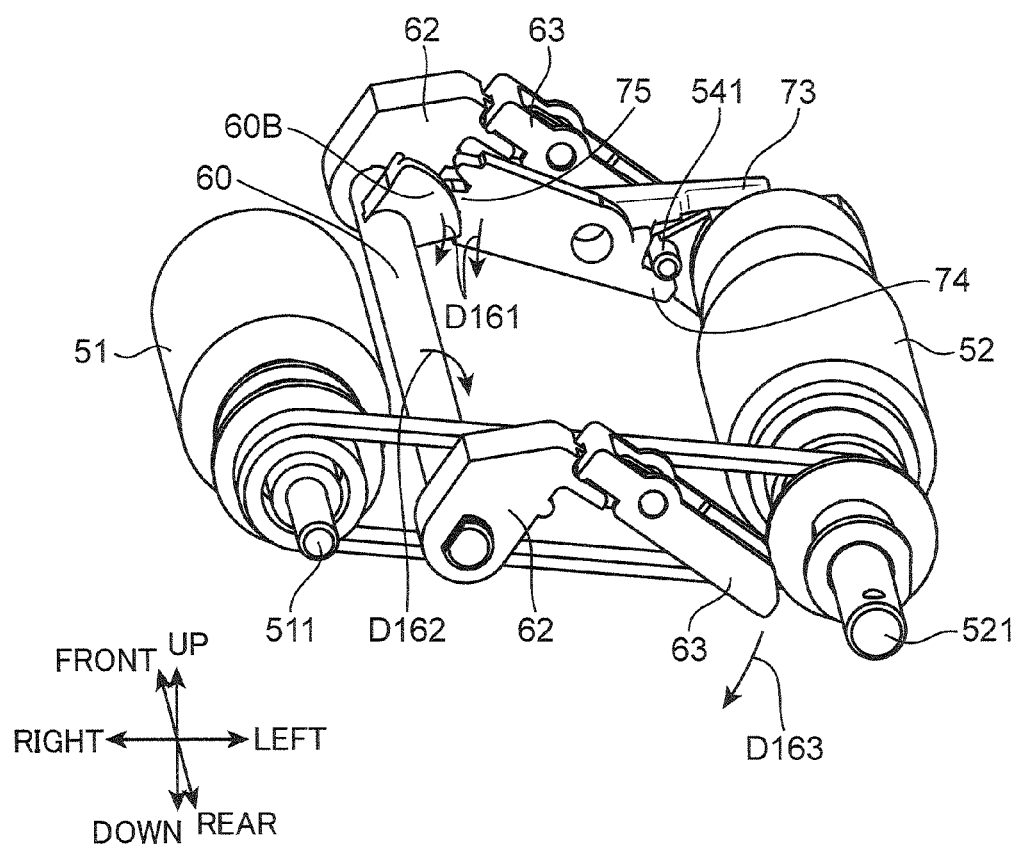
FIG. 16 is a perspective view showing the internal state of the document feeding unit of FIG. 12.

Next, a restricting function and projecting and retracting movements of the stoppers 63 are described in detail with reference to FIGS. 9 to 16. FIG. 9 is a side view of the document feeding unit 5 according to this embodiment. FIG. 10 is a side view showing an internal state of the document feeding unit 5 of FIG. 9. FIG. 11 is a perspective view showing the internal state of the document feeding unit 5 of FIG. 9. FIG. 12 is a side view of the document feeding unit 5, and FIG. 13 is a side view showing an internal state of the document feeding unit 5 of FIG. 12. Similarly, FIG. 14 is a sectional view showing the internal state of the document feeding unit 5 of FIG. 12, and FIGS. 15 and 16 are perspective views showing the internal state of the document feeding unit 5 of FIG. 12. Note that FIGS. 9 to 11 show a state where the feed roller 52 is rotated backward (rotated in the second direction) and the stoppers 63 project into the first conveyance path 341. Further, FIGS. 12 to 16 show a state where the feed roller 52 is rotated forward (rotated in the first direction) and the stoppers 63 retract from the first conveyance path 341.

<Concerning Restricting Function of Stoppers 63>

As shown in FIGS. 9 to 11, the stoppers 63 are caused to project into the first conveyance path 341 by backward rotation of the feed roller 52 when a sheet feeding operation of the feed roller 52 is not performed. As a result, even if document sheets P are strongly pushed toward the feed roller 52 as shown by an arrow D101 of FIG. 10, the contact of the document sheets P with the feed roller 52 is inhibited. An arrangement around the lever 70 in this state is additionally described. The contact portion 541 of the torque limiter 54 is in a posture projecting upward and held in contact with the lower surface of the first projection 73 of the lever 70. The lever 70 is so arranged that the first and second projections 73, 74 face upward with respect to the supporting point portion 72 and the side of the second gear portion 75 slightly faces downward. As a result, as shown in FIG. 11, the first gear portion 60B engaged with the second gear portion 75 is also arranged to slightly face downward. In other words, out of the arcuately arranged gears, gear parts on the upper ends are in contact with each other in the first and second gear portions 60B, 75. Out of the stopper assemblies 61 fixed to the opposite end parts of the lever shaft 60, the stoppers 63 extend downward.

Here, the upper end parts 63A of the stoppers 63 are arranged to face the projections 62A projecting from the stopper support portions 62. Thus, if the document sheets P are pushed in the direction of the arrow D101 of FIG. 10, the upper end parts 63A come into contact with the projections 62A, wherefore the stoppers 63 are inhibited from rotating clockwise about the pivot portions 64. Specifically, the entrance of the document sheets P toward the feed roller 52 is inhibited. Further, if the document sheets P are pushed in the direction of the arrow D101 of FIG. 10, a rotational force is applied to the first gear portion 60B of the lever shaft 60 and the second gear portion 75 in a direction of an arrow D111 of FIG. 11 by a pressing force transmitted to the stoppers 63 and the stopper support portions 62. In this case, there is a possibility that the lever 70 is rotated about the supporting point portion 72 and the torque limiter 54 is erroneously rotated. However, in this embodiment, a pressing force acting on the contact portion 541 of the first projection 73 is applied to the axial center of the feed roller shaft 521 or to the vicinity of the axial center as indicated by an arrow D102 of FIG. 10. Thus, a circumferential force to rotate the torque limiter 54 is unlikely to be applied to the contact portion 541. As a result, even if the document sheets P are strongly pushed toward the stoppers 63, the torque limiter 54 and the feed roller 52 are inhibited from being erroneously rotated.

<Projecting and Retracting Movements of Stoppers 63>

When a sheet feeding operation of the automatic document feeder 3A is started in the state of FIGS. 9 to 11, the feed roller shaft 521 is rotated forward (first direction) by the aforementioned motor 400 (arrow R1 of FIGS. 6B, 8 and 9). As described above, the torque limiter 54 is rotated integrally with the feed roller shaft 521 with a low torque when the rotation of the feed roller 52 is started. As a result, the contact portion 541 is rotated in a direction indicated by an arrow D103 of FIG. 10. With this rotation, the contact portion 541 is separated from the first projection 73 and comes into contact with the second projection 74 arranged downstream of the first projection 73 in the first direction. As a result, the lever 70 is rotated about the supporting point portion 72 and the side of the second gear portion 75 of the lever 70 is moved upward. Then, the first gear portion 60B engaged with the second gear portion 75 is also similarly moved upward (arrow D111 of FIG. 11) and the lever shaft 60 is rotated to pull up the stoppers 63 (arrow D91 of FIG. 9, arrows D112, D113 of FIG. 11). As a result, the contact portion 541, the lever 70 and the lever shaft 60 are arranged and the stoppers 63 retract from the first conveyance path 341 as shown in FIGS. 12 to 16. Note that, in FIGS. 12 to 16, the stoppers 63 retracted from the first conveyance path 341 are shown to be substantially perpendicular to the stopper support portions 62. In retracting the stoppers 63 from the first conveyance path 341, the stoppers 63 may rotate about the pivot points 64 under the weight thereof and extend downward. Even in this case, lower end parts of the stoppers 63 are located above a straight line connecting the lowermost parts of the circumferential surfaces of the pickup roller 51 and the feed roller 52, whereby the stoppers 63 do not block the conveyance of a document sheet. Further, as described later, since the holder 50 is rotated to move the pickup roller 51 downward during the sheet feeding operation of the feed roller 52, the lower end parts of the stoppers 63 do not touch the document sheet.

The arrangement around the lever 70 in the state shown in FIGS. 12 to 16 is additionally descried. The contact portion 541 of the torque limiter 54 is in a posture projecting substantially rightward and in contact with the upper surface of the second projection 74 of the lever 70 (see FIG. 14). At this time, the contact portion 541 is arranged to be sandwiched between the first and second projections 73, 74. The lever 70 is so arranged that the side of the first and second projections 73, 74 of the lever 70 is inclined downward with respect to the supporting point portion 72 and the side of the second gear portion 75 faces slightly upward. As a result, the first gear portion 60B engaged with the second gear portion 75 is also arranged to face slightly upward. In other words, out of the arcuately arranged gears, the gear parts on lower end parts are in contact with each other in the first and second gear portions 60B, 75. Out of the stopper assembly 61 fixed to the opposite end parts of the lever shaft 60, the stopper support portions 62 extend toward an upper-left side and the stoppers 63 extend toward a lower-left side. Note that the stoppers 63 may extend downward as described above.

When the feed roller 52 and the pickup roller 51 are rotated in the state shown in FIGS. 12 to 16, a document sheet P placed on the document feed tray 31 is sent out to the first conveyance path 341. When this sheet feeding operation is finished, the motor 400 is rotated in the reverse direction by an unillustrated control unit. As a result, the feed roller shaft 521 is rotated in the reverse direction (second direction) (arrow R2 of FIGS. 6B, 8 and 9). As during forward rotation, the torque limiter 54 is rotated integrally with the feed roller shaft 521 with a low torque when the rotation of the feed roller 52 is started. As a result, the contact portion 541 is rotated in a direction indicated by an arrow D141 of FIG. 14. With this rotation, the contact portion 541 is separated from the second projection 74 and comes into contact with the first projection 73 again. As a result, the lever 70 is rotated about the supporting point portion 72 and the side of the second gear portion 75 of the lever 70 is moved downward. Then, the first gear portion 60B engaged with the second gear portion 75 is also similarly moved downward (arrow D161 of FIG. 16) and the lever shaft 60 is rotated to push down the stoppers 63 (arrow D92 of FIG. 9, arrows D162, D163 of FIG. 16). As a result, the contact portion 541, the lever 70 and the lever shaft 60 are arranged and the stoppers 63 project into the first conveyance path 341 again as shown in FIGS. 9 to 11. As just described, in this embodiment, the projecting and retracting movements of the stopper 63 into and from the first conveyance path 341 are realized in accordance with rotational movements of the feed roller 52. Particularly, when the feed roller 52 is rotated in the first direction to convey the document sheet P, the stoppers 63 are caused to retract from the first conveyance path 341. Further, in correspondence with the rotation of the feed roller 52 in the second direction, the stoppers 63 are caused to project into the first conveyance path 341. Thus, the stoppers 63 do not block the conveyance of the document sheet P during the sheet feeding operation of the feed roller 52. Further, the stoppers 63 can preferably restrict the position of the document sheet P in a state where the feed roller 52 is not conveying the document sheet P in the sheet conveying direction. Further, utilizing the torque when the rotation of the feed roller 52 in the first and second directions is started, the contact portion 541 can be moved by the torque limiter 54. Further, the lever shaft 60 is rotated and the projecting and retracting movements of the stoppers 63 are preferably realized by the contact of the contact portion 541 with the lever 70.

<Concerning Rotational Movements of Holder 50>

Further, in this embodiment, rotational movements of the holder 50 and upward and downward movements of the pickup roller 51 are realized in accordance with rotational movements of the feed roller 52. The holder 50 includes a first protrusion 503B shown in FIGS. 6B and 7. Further, the holder 50 includes a second protrusion 503E shown in FIGS. 6A and 14.

The protrusion 503B is a projection projecting from the inner surface of the front wall 503. The first protrusion 503B projects to be inserted into a rotational path of the contact portion 541. With reference to FIG. 14, the contact portion 541 comes into contact with the first protrusion 503B (FIG. 7) after pushing down the second projection 74 with forward rotation of the feed roller 52. As described above, the contact portion 541 is so arranged that the width thereof extends in the axial direction of the feed roller shaft 521. Thus, while one end side of the contact portion 541 in the axial direction is kept in contact with the second projection 74, the other end side of the contact portion 541 comes into contact with the first protrusion 503B. The contact portion 541 held in contact with the first protrusion 503B pushes the holder 50 downward by a rotational force transmitted to the feed roller shaft 521. As a result, the side of the pickup roller 51 of the holder 50 is pushed downward with the feed roller shaft 521 as a supporting point. Specifically, the holder 50 is rotated about the feed roller shaft 521 in the first direction (see arrow R1A of FIG. 9). Then, the pickup roller 51 comes into contact with document sheets P placed on the document feed tray 31, whereby the rotation of the holder 50 is stopped.

Similarly, the second protrusion 503E is a projection projecting from the inner surface of the front wall 503. The second protrusion 503E projects to be inserted into the rotational path of the contact portion 541. With reference to FIG. 14, the contact portion 541 comes into contact with the second protrusion 503E after coming into contact with the lower surface of the first projection 73 with reverse rotation of the feed roller 52. At this time, as shown in FIG. 6A, a base end part 541A (FIGS. 11 and 14) of the contact portion 541 comes into contact with the second protrusion 503E while the tip part of the contact portion 541 is kept in contact with the first projection 73. The contact portion 541 held in contact with the second protrusion 503E pushes the holder 50 upward by a rotational force transmitted to the feed roller shaft 521. As a result, the side of the pickup roller 51 of the holder 50 is pushed upward with the feed roller shaft 521 as a supporting point. Specifically, the holder 50 is rotated about the feed roller shaft 521 in the second direction (see arrow R2A of FIG. 9). As a result, the pickup roller 51 is separated upward from the document sheets P on the document feed tray 31. Then, the ceiling plate 501 of the holder 50 comes into contact with the upper cover unit 32U (FIG. 4), whereby the rotation of the holder 50 is stopped. As just described, in this embodiment, the holder 50 is rotated to realize upward and downward movements of the pickup roller 51 in accordance with rotational movements of the feed roller 52. Thus, retracting movements of the stoppers 63 and a movement of the pickup roller 51 to a sheet feeding position are preferably realized with a movement of the contact portion 541 in the first direction. Further, projecting movements of the stoppers 63 and a movement of the pickup roller 51 to a non-sheet feeding position are preferably realized with a movement of the contact portion 541 in the second direction. Particularly, the contact portion 541 comes into contact with the first and second projections 73, 74 according to the rotation direction of the feed roller 52, whereby the lever 70 is rotated in a different direction and the lever shaft 60 is rotated in the third and fourth directions. As a result, movements of the contact portion 541 are accurately translated into projecting and retracting movements of the stoppers 63 by the lever 70.

As described above, according to the above embodiment, the stoppers 63 can project into and retract from the first conveyance path 341 between the document feed tray 31 and the feed roller 52. In the projecting state, the stoppers 63 prevent the document sheets P stacked on the document feed tray 31 from coming into contact with the feed roller 52. Thus, it is inhibited that, when being stacked on the document feed tray 31, the document sheets P are strongly pushed to around the feed roller 52 to hinder the conveying function of the feed roller 52. Further, the interlocking unit 8 causes the stoppers 63 to project into and retract from the first conveyance path 341 in accordance with rotational movements of the feed roller 52. Thus, it is not necessary to provide a dedicated driving unit for projecting and retracting movements of the stoppers 63 and it is possible to stably realize position changes and posture keeping of the stoppers 63 according to rotational movements of the feed roller 52.

Further, according to the above embodiment, if the document sheets P are strongly pushed toward the stoppers 63 projecting into the first conveyance path 341, an external force transmitted from the lever shaft 60 to the lever 70 is transmitted from the first projection 73 to the contact portion 541. At this time, a pressing force acting on the contact portion 541 of the first projection 73 is applied to the axial center of the feed roller shaft 521 or the vicinity of the axial center. Thus, the rotation of the torque limiter 54 and the movement of the feed roller 52 due to a circumferential movement of the contact portion 541 are preferably inhibited. Further, even if a user applies vibration to the automatic document feeder 3A to align one end of a document stack, the rotation of the torque limiter 54 and the feed roller shaft 521 supporting this is preferably inhibited since the first projection 73 and the contact portion 541 are pressed against each other.

Further, in the image reading apparatus 3 including the automatic document feeder 3A and the image forming apparatus 1 according to the above embodiment, it is possible to stably realize position changes and posture keeping of the stoppers 63 according to rotational movements of the feed roller 52. As a result, the document sheet P can be stably conveyed to the image reading position. As a result, an image is stably formed on a sheet according to a document image read by the reading unit represented by the CIS unit 224.

Although the automatic document feeder 3A, the image reading apparatus 3 and the image forming apparatus 1 according to this embodiment are described above, the present disclosure is not limited to this embodiment and, for example, can be modified as follows.

(1) Although the automatic document feeder 3A is described as a sheet conveying device for conveying a sheet in the above embodiment, the present disclosure is not limited to this. Specifically, the present disclosure may also be applied to a sheet conveying device for conveying sheets stacked on the sheet cassette 211 or the sheet feed tray 43 as a sheet stacking portion toward the image forming station 93. In this case, an image is formed on the sheet conveyed by the sheet conveying device in the image forming station 93.

(2) Although projecting and retracting movements of the stoppers 63 are realized in accordance with rotational movements of the feed roller 52 in the above embodiment, the present disclosure is not limited to this. The interlocking unit 8 may cause the stoppers 63 to project into and retract from the first conveyance path 341 in accordance with rotational movements of the pickup roller 51.

(3) Although the feed roller 52 is used as a sheet feeding member arranged at the entrance side of the sheet conveyance path for conveying a sheet in the above embodiment, the present disclosure is not limited to this. The sheet feeding member may be a rotational belt member.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:
1. A sheet conveying device, comprising:
a sheet stacking portion on which sheets are to be stacked;
a sheet conveyance path through which the sheet is conveyed in a predetermined conveying direction from the sheet stacking portion;
a sheet feeding member which is arranged at an entrance side of the sheet conveyance path and conveys the sheet by being driven and rotated;
a driving unit which drives and rotates the sheet feeding member;
a stopper which is projectable into and retractable from the sheet conveyance path at a side upstream of the sheet feeding member in the conveying direction and prevents the sheets stacked on the sheet stacking portion from coming into contact with the sheet feeding member in a projecting state; and
an interlocking unit which causes the stopper to project into and retract from the sheet conveyance path in accordance with rotational movements of the sheet feeding member;

a rotary shaft that rotatably supports the sheet feeding member, is coupled to the driving unit and rotated in the first and second directions and serves as an axis of rotation in the rotation of the sheet feeding member;

a holder that rotatably supports the rotary shaft; and a support shaft that extends in an extending direction of the rotary shaft, is rotatably supported in the holder and supports the stopper; wherein:

the interlocking unit includes:

a torque limiter that is rotatably supported on the rotary shaft, rotated in the first and second directions integrally with the rotary shaft with a first rotational torque and idly rotated relative to the rotary shaft with a second rotational torque higher than the first rotational torque;

a contact piece that projects in a radial direction of the rotary shaft from the torque limiter; and a coupling member that comes into contact with the contact piece in correspondence with the rotation of the rotary shaft in the first and second directions and rotates the support shaft in a third direction and a fourth direction opposite to the third direction; and wherein:

the driving unit drives and rotates the sheet feeding member in a first direction and a second direction opposite to the first direction;

the sheet feeding member conveys the sheet in the conveying direction by being driven and rotated in the first direction;

the interlocking unit causes the stopper to project into the sheet conveyance path in correspondence with the rotation of the sheet feeding member in the second direction and to retract from the sheet conveyance path in correspondence with the rotation of the sheet feeding member in the first direction; and the stopper is caused to retract from the sheet conveyance path with the rotation of the support shaft in the third direction and to project into the sheet conveyance path with the rotation of the support shaft in the fourth direction.

2. A sheet conveying device according to claim 1, further comprising:

a pickup roller which is rotatably supported in the holder at a side of the support shaft opposite to the sheet feeding member and sends out the sheet on the sheet stacking portion toward the sheet feeding member; and a first protrusion which projects from the holder into a rotational path of the contact piece;

wherein the contact piece rotates the holder in the first direction about the rotary shaft to bring the pickup roller into contact with the sheets stacked on the sheet stacking portion by further coming into contact with the first protrusion in a state held in contact with the coupling member with the rotation of the rotary shaft in the first direction.

3. A sheet conveying device according to claim 2, further comprising a second protrusion which projects from the holder into the rotational path of the contact piece while being spaced apart from the first protrusion in a circumferential direction of the rotary shaft; wherein:

the contact piece rotates the holder in the second direction about the rotary shaft to separate the pickup roller from the sheets stacked on the sheet stacking portion by further coming into contact with the second protrusion in a state held in contact with the coupling member with the rotation of the rotary shaft in the second direction.

4. A sheet conveying device according to claim 1, wherein:

the coupling member includes:

a supporting point portion which is rotatably supported on the holder;

a first projection which extends from the supporting point portion toward the torque limiter;

a second projection which extends from the supporting point portion toward the torque limiter at a side downstream of the first projection in the first direction and forms a forked shape together with the first projection; and an engaging portion which is arranged to face the support shaft at a side of the supporting point portion opposite to the first and second projections;

the support shaft includes an engageable portion to be engaged with the engaging portion;

the support shaft including the engageable portion rotates in the third direction by the engagement of the engageable portion with the engaging portion when the coupling member rotates about the supporting point portion by the rotation of the rotary shaft in the first direction to bring the contact piece into contact with the second projection: and the support shaft including the engageable portion rotates in the fourth direction by the engagement of the engageable portion with the engaging portion when the coupling member rotates about the supporting point portion in a direction opposite to a direction in the case of coming into contact with the second projection by the rotation of the rotary shaft in the second direction to bring the contact piece into contact with the first projection.

5. A sheet conveying device according to claim 4, wherein:

a pressing force acting on the contact piece of the first projection is applied toward an axial center of the rotary shaft or the vicinity of the axial center in a state where the contact piece is held in contact with the first projection and the stopper is projecting into the sheet conveyance path.

6. An image reading apparatus, comprising:

a sheet conveying device which includes a sheet conveyance path through which a sheet as a document is conveyed and conveys the sheet to the sheet conveyance path; and a reading unit which is arranged to face an image reading position arranged in the sheet conveyance path and reads a document image of the sheet;

the sheet conveying device, including:

a sheet stacking portion on which sheets are to be stacked;

the sheet conveyance path through which the sheet is conveyed in a predetermined conveying direction from the sheet stacking portion;

a sheet feeding member which is arranged at an entrance side of the sheet conveyance path and conveys the sheet by being driven and rotated;

a driving unit which drives and rotates the sheet feeding member;

a stopper which is projectable into and retractable from the sheet conveyance path at a side upstream of the sheet feeding member in the conveying direction and prevents the sheets stacked on the sheet stacking portion from coming into contact with the sheet feeding member in a projecting state;

an interlocking unit which causes the stopper to project into and retract from the sheet conveyance path in accordance with rotational movements of the sheet feeding member;

a rotary shaft that rotatably supports the sheet feeding member, is coupled to the driving unit and rotated in the first and second directions and serves as an axis of rotation in the rotation of the sheet feeding member;

a holder that rotatably supports the rotary shaft; and a support shaft that extends in an extending direction of the rotary shaft, is rotatably supported in the holder and supports the stopper; wherein:

the interlocking unit includes:

a torque limiter that is rotatably supported on the rotary shaft, rotated in the first and second directions integrally with the rotary shaft with a first rotational torque and idly rotated relative to the rotary shaft with a second rotational torque higher than the first rotational torque;

a contact piece that projects in a radial direction of the rotary shaft from the torque limiter; and a coupling member that comes into contact with the contact piece in correspondence with the rotation of the rotary shaft in the first and second directions and rotates the support shaft in a third direction and a fourth direction opposite to the third direction; and wherein:

the driving unit drives and rotates the sheet feeding member in a first direction and a second direction opposite to the first direction;

the sheet feeding member conveys the sheet in the conveying direction by being driven and rotated in the first direction;

the interlocking unit causes the stopper to project into the sheet conveyance path in correspondence with the rotation of the sheet feeding member in the second direction and to retract from the sheet conveyance path in correspondence with the rotation of the sheet feeding member in the first direction; and the stopper is caused to retract from the sheet conveyance path with the rotation of the support shaft in the third direction and to project into the sheet conveyance path with the rotation of the support shaft in the fourth direction.

7. An image reading apparatus according to claim 6, further comprising:

a pickup roller which is rotatably supported in the holder at a side of the support shaft opposite to the sheet feeding member and sends out the sheet on the sheet stacking portion toward the sheet feeding member; and a first protrusion which projects from the holder into a rotational path of the contact piece;

wherein the contact piece rotates the holder in the first direction about the rotary shaft to bring the pickup roller into contact with the sheets stacked on the sheet stacking portion by further coming into contact with the first protrusion in a state held in contact with the coupling member with the rotation of the rotary shaft in the first direction.

8. An image reading apparatus according to claim 7, further comprising a second protrusion which projects from the holder into the rotational path of the contact piece while being spaced apart from the first protrusion in a circumferential direction of the rotary shaft; wherein:

the contact piece rotates the holder in the second direction about the rotary shaft to separate the pickup roller from the sheets stacked on the sheet stacking portion by further coming into contact with the second protrusion in a state held in contact with the coupling member with the rotation of the rotary shaft in the second direction.

9. An image reading apparatus according to claim 6, wherein:

the coupling member includes:

a supporting point portion which is rotatably supported on the holder;

a first projection which extends from the supporting point portion toward the torque limiter;

a second projection which extends from the supporting point portion toward the torque limiter at a side downstream of the first projection in the first direction and forms a forked shape together with the first projection; and an engaging portion which is arranged to face the support shaft at a side of the supporting point portion opposite to the first and second projections;

the support shaft includes an engageable portion to be engaged with the engaging portion;

the support shaft including the engageable portion rotates in the third direction by the engagement of the engageable portion with the engaging portion when the coupling member rotates about the supporting point portion by the rotation of the rotary shaft in the first direction to bring the contact piece into contact with the second projection: and the support shaft including the engageable portion rotates in the fourth direction by the engagement of the engageable portion with the engaging portion when the coupling member rotates about the supporting point portion in a direction opposite to a direction in the case of coming into contact with the second projection by the rotation of the rotary shaft in the second direction to bring the contact piece into contact with the first projection.

10. An image forming apparatus, comprising:

a sheet conveying device which includes a sheet conveyance path through which a sheet as a document is conveyed and conveys the sheet to the sheet conveyance path;

a reading unit which is arranged to face an image reading position arranged in the sheet conveyance path and reads a document image of the sheet; and an image forming station for forming an image on a sheet according to the document image read by the reading unit;

wherein the sheet conveying device includes:

a sheet stacking portion on which sheets are to be stacked;

the sheet conveyance path through which the sheet is conveyed in a predetermined conveying direction from the sheet stacking portion;

a sheet feeding member which is arranged at an entrance side of the sheet conveyance path and conveys the sheet by being driven and rotated;

a driving unit which drives and rotates the sheet feeding member;

a stopper which is projectable into and retractable from the sheet conveyance path at a side upstream of the sheet feeding member in the conveying direction and prevents the sheets stacked on the sheet stacking portion from coming into contact with the sheet feeding member in a projecting state;

an interlocking unit which causes the stopper to project into and retract from the sheet conveyance path in accordance with rotational movements of the sheet feeding member;

a rotary shaft that rotatably supports the sheet feeding member, is coupled to the driving unit and rotated in the first and second directions and serves as an axis of rotation in the rotation of the sheet feeding member;

a holder that rotatably supports the rotary shaft; and
a support shaft that extends in an extending direction of the rotary shaft, is rotatably supported in the holder and supports the stopper; wherein
the interlocking unit includes:
a torque limiter that is rotatably supported on the rotary shaft, rotated in the first and second directions integrally with the rotary shaft with a first rotational torque and idly rotated relative to the rotary shaft with a second rotational torque higher than the first rotational torque;
a contact piece that projects in a radial direction of the rotary shaft from the torque limiter; and
a coupling member that comes into contact with the contact piece in correspondence with the rotation of the rotary shaft in the first and second directions and rotates the support shaft in a third direction and a fourth direction opposite to the third direction; and wherein:
the driving unit drives and rotates the sheet feeding member in a first direction and a second direction opposite to the first direction;
the sheet feeding member conveys the sheet in the conveying direction by being driven and rotated in the first direction;
the interlocking unit causes the stopper to project into the sheet conveyance path in correspondence with the rotation of the sheet feeding member in the second direction and to retract from the sheet conveyance path in correspondence with the rotation of the sheet feeding member in the first direction; and
the stopper is caused to retract from the sheet conveyance path with the rotation of the support shaft in the third direction and to project into the sheet conveyance path with the rotation of the support shaft in the fourth direction.

11. An image forming apparatus according to claim 10, further comprising:
a pickup roller which is rotatably supported in the holder at a side of the support shaft opposite to the sheet feeding member and sends out the sheet on the sheet stacking portion toward the sheet feeding member; and
a first protrusion which projects from the holder into a rotational path of the contact piece;
wherein the contact piece rotates the holder in the first direction about the rotary shaft to bring the pickup roller into contact with the sheets stacked on the sheet stacking portion by further coming into contact with the first protrusion in a state held in contact with the coupling member with the rotation of the rotary shaft in the first direction.

12. An image forming apparatus according to claim 11, further comprising a second protrusion which projects from the holder into the rotational path of the contact piece while being spaced apart from the first protrusion in a circumferential direction of the rotary shaft; wherein:
the contact piece rotates the holder in the second direction about the rotary shaft to separate the pickup roller from the sheets stacked on the sheet stacking portion by further coming into contact with the second protrusion in a state held in contact with the coupling member with the rotation of the rotary shaft in the second direction.

13. An image forming apparatus according to claim 10, wherein:
the coupling member includes:
a supporting point portion which is rotatably supported on the holder;
a first projection which extends from the supporting point portion toward the torque limiter;
a second projection which extends from the supporting point portion toward the torque limiter at a side downstream of the first projection in the first direction and forms a forked shape together with the first projection; and
an engaging portion which is arranged to face the support shaft at a side of the supporting point portion opposite to the first and second projections;
the support shaft includes an engageable portion to be engaged with the engaging portion;
the support shaft including the engageable portion rotates in the third direction by the engagement of the engageable portion with the engaging portion when the coupling member rotates about the supporting point portion by the rotation of the rotary shaft in the first direction to bring the contact piece into contact with the second projection: and
the support shaft including the engageable portion rotates in the fourth direction by the engagement of the engageable portion with the engaging portion when the coupling member rotates about the supporting point portion in a direction opposite to a direction in the case of coming into contact with the second projection by the rotation of the rotary shaft in the second direction to bring the contact piece into contact with the first projection.

* * * * *